(12) United States Patent
Bukov et al.

(10) Patent No.: US 12,456,104 B2
(45) Date of Patent: *Oct. 28, 2025

(54) DYNAMIC MULTI-PATH TRANSFERS

(71) Applicant: 1inch Limited, Tortola (VG)

(72) Inventors: Anton Bukov, Amstelveen (NL);
Sergej Kunz, Stuttgart (DE)

(73) Assignee: 1inch Limited, Tortola (VG)

( * ) Notice: Subject to any disclaimer, the term of this patent is extended or adjusted under 35 U.S.C. 154(b) by 37 days.

This patent is subject to a terminal disclaimer.

(21) Appl. No.: 18/439,661

(22) Filed: Feb. 12, 2024

(65) Prior Publication Data
US 2024/0273486 A1 Aug. 15, 2024

Related U.S. Application Data

(60) Provisional application No. 63/484,317, filed on Feb. 10, 2023.

(51) Int. Cl.
| | |
|---|---|
| *G06Q 20/00* | (2012.01) |
| *G06Q 20/10* | (2012.01) |
| *G06Q 20/36* | (2012.01) |
| *G06Q 20/42* | (2012.01) |

(52) U.S. Cl.
CPC ......... *G06Q 20/10* (2013.01); *G06Q 20/3678* (2013.01); *G06Q 20/42* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 6,422,373 B1 * | 7/2002 | Yellop | G07F 5/22 |
| | | | 194/217 |
| 11,123,456 B2 | 9/2021 | Masinaei et al. | |
| 11,234,567 B2 | 2/2022 | Thorne et al. | |
| 11,456,789 B2 | 9/2022 | Hou et al. | |
| 11,544,786 B2 | 1/2023 | Diamond | |
| 11,567,890 B2 | 1/2023 | Bussing et al. | |

(Continued)

OTHER PUBLICATIONS

Celestino; An_attempt_at_introducing_Multipath_in_QUIC; IEEE, Univ of Napoli; pp. 352-357; 2018.*

(Continued)

*Primary Examiner* — Radu Andrei
(74) *Attorney, Agent, or Firm* — Perkins Coie LLP

(57) ABSTRACT

Systems and methods for determining and executing complex multi-route transfers of digital assets are described. A multi-route transfer of a source asset for a destination asset may be determined by analyzing a graph representing a plurality of assets and exchanges to determine a plurality of unique transfer paths. A transfer path may reflect a direct transfer in which the source asset is swapped for the destination asset, or it may reflect a series of intermediate transfers in which the source asset is swapped for intermediate asset(s) that are swapped for the destination asset. Dynamic programming can be used to select the transfer paths to include in the multi-route transfer, how to distribute swaps across those transfer paths, and how to distribute swaps for each transfer of a transfer path—thereby optimizing for the total amount of the destination asset received while accounting for transaction fees.

20 Claims, 6 Drawing Sheets

(56) References Cited

U.S. PATENT DOCUMENTS

| | | |
|---|---|---|
| 11,678,901 B2 | 6/2023 | Scoggins et al. |
| 11,789,012 B2 | 10/2023 | Janes et al. |
| 11,890,123 B2 | 2/2024 | Boone et al. |
| 12,099,978 B2 | 9/2024 | Bukov et al. |
| 12,277,536 B2 * | 4/2025 | Dominique ............ G06Q 40/04 |
| 2003/0200439 A1 * | 10/2003 | Moskowitz ......... H04L 63/1408 |
| | | 713/181 |
| 2008/0264043 A1 * | 10/2008 | Kawakita ............. F01N 3/2066 |
| | | 60/301 |
| 2010/0235277 A1 | 9/2010 | Van et al. |
| 2013/0157711 A1 * | 6/2013 | Lee ...................... H04W 48/18 |
| | | 455/525 |
| 2014/0040114 A1 | 2/2014 | Baumgart et al. |
| 2014/0289163 A1 * | 9/2014 | Michaud ............... G06Q 40/06 |
| | | 705/36 R |
| 2018/0352033 A1 | 12/2018 | Pacella et al. |
| 2019/0349261 A1 | 11/2019 | Smith et al. |
| 2019/0373521 A1 | 12/2019 | Crawford |
| 2019/0379595 A1 * | 12/2019 | Ur ............................ G06N 3/08 |
| 2019/0385156 A1 | 12/2019 | Liu |
| 2019/0392511 A1 | 12/2019 | Mahajan et al. |
| 2020/0082025 A1 | 3/2020 | Zhou et al. |
| 2020/0104835 A1 | 4/2020 | Day et al. |
| 2020/0119925 A1 | 4/2020 | Wang |
| 2021/0035246 A1 | 2/2021 | Schouppe et al. |
| 2021/0073913 A1 | 3/2021 | Ingargiola |
| 2021/0352142 A1 * | 11/2021 | Jayaram ................ G06Q 20/26 |
| 2022/0126438 A1 * | 4/2022 | Cristache .............. B25J 13/006 |
| 2022/0134547 A1 * | 5/2022 | Cristache .............. B25J 11/008 |
| | | 700/245 |
| 2022/0174491 A1 * | 6/2022 | Cristache ............. H04W 12/08 |
| 2022/0266451 A1 * | 8/2022 | Cristache ............. G05D 1/0246 |
| 2022/0341217 A1 * | 10/2022 | Cristache ................ G06N 5/02 |
| 2023/0198886 A1 * | 6/2023 | Ur ...................... G06Q 20/3572 |
| | | 705/39 |
| 2023/0206329 A1 | 6/2023 | Cella et al. |
| 2023/0267456 A1 | 8/2023 | Garner et al. |
| 2023/0385822 A1 | 11/2023 | Shanmugam et al. |
| 2024/0273487 A1 | 8/2024 | Bukov et al. |
| 2024/0420227 A1 | 12/2024 | Bukov et al. |
| 2024/0428209 A1 | 12/2024 | Bukov et al. |
| 2025/0165937 A1 | 5/2025 | Bukov et al. |

OTHER PUBLICATIONS

Gabriel; No_Plan_Survives_Contact_with_the_Enemy_On_Gains_of_Coded_Multipath_over_MPTCP; IEEE; 8 pages; 2021.*

Li; Multipath_Transmission_for_the_Internet_A_Survey; IEEE; 2016; pp. 2887-2925.*

Wu; Peekaboo_Learning-Based_Multipath_Scheduling_for_Dynamic_Heterogeneous_Environments; IEEE; pp. 2995-2310; 2020.*

Anonymous: "1inch.io", Jan. 4, 2023, XP093135078, Retrieved from the Internet on Feb. 26, 2024: URL:http://1inch.io.

Benligiray et al., "Decentralized APIs for Web 3.0", api3.org, Jan. 9, 2024, pp. 1-40.

Breidenbach et al., "Chainlink 2.0: Next Steps in the Evolution of Decentralized Oracle Networks", Retrieved from the Internet: URL:https://research.chain.link/whitepaper-v2.pdf, Apr. 15, 2021, pp. 1-136.

Fang Lucius et al.: "How to DEFI (Advanced)", May 31, 2021, pp. 1-290, XP055960691, ISBN: 9798530318443, Retrieved from the Internet on Feb. 27, 2024: URL:https://cp0x.com/applications/core/interface/file/attachment.php?id=1653&key=fca3e1489485ef25c33f83d8636fd16b.

International Search Report and Written Opinion for Application No. PCT/IB2024/051299, dated May 14, 2024, 13 pages.

Patent Application as filed of U.S. Appl. No. 18/408,376, filed Jan. 9, 2024, 81 pages.

Xu, J. et al., "SoK: Decentralized Exchanges (DEX) with Automated Market Maker (AMM) protocols" Arxiv.Org, Cornell University Library, Apr. 19, 2021, XP081930404.

Xue, Y. et al., "Invited Paper: Fault-tolerant and Expressive Cross-Chain Swaps", arxiv.org, Cornell University Library, Nov. 1, 2022, XP091357638.

File History of corresponding U.S. Appl. No. 63/484,317, filed Feb. 10, 2023.

File History and the references cited therein of corresponding U.S. Appl. No. 18/597,680, filed Mar. 6, 2024, issued Sep. 24, 2024 as U.S. Pat. No. 12,099,978 B2.

File History and the references cited therein of corresponding U.S. Appl. No. 18/809,084, filed Aug. 19, 2024, published May 22, 2025 as U.S. Publication No. 2025-0165937 A1.

* cited by examiner

DYNAMIC MULTI-PATH TRANSFERS

CROSS-REFERENCE TO RELATED APPLICATIONS

This application claims the benefit of U.S. Provisional Patent Application No. 63/484,317, entitled "SYSTEMS, METHODS, AND DEVICES FOR DYNAMIC MULTI-PATH TRANSFERS," filed Feb. 10, 2023, the contents of which are incorporated by reference herein in their entirety.

Any and all applications for which a foreign or domestic priority claim is identified in the Application Data Sheet as filed with the present application are hereby incorporated by reference under 37 CFR 1.57.

TECHNICAL FIELD

The embodiments herein are generally directed to systems, methods, and devices for digital asset exchange and smart order routing. More specifically, embodiments of the disclosure relate to determining and executing a multi-route transfer for a cryptocurrency token swap that will maximize the amount of output cryptocurrency token being swapped for.

BACKGROUND

Users often transfer and exchange digital assets as swaps of blockchain-based cryptocurrency tokens, in which an amount of a source token is exchanged for an amount of a destination token. Such swaps can be performed over centralized exchanges and decentralized exchanges, the latter of which are gaining in popularity. These swaps typically require that the user pay transaction fees to incentivize nodes of the blockchain network to process the transaction. These transaction fees are sometimes referred to as gas fees.

A user seeking to execute a large transaction can often lose a substantial fraction of the total transaction amount to slippage, or how much the price for a specific asset has changed, since the large volume of the transaction is more likely to impact market prices and the observed exchange rate. In other words, when a user exchanges a large volume of a source token, the exchange rate between the source token and the destination token (e.g., the amount of the destination token received) may be lower than the exchange rate when the user is seeking to exchange a small volume of the source token.

In order to optimize the exchange rate and the amount of destination token received from such transactions, the trade may require additional complexity beyond sending out a single order to execute a simple swap on a single exchange. For example, the transaction could be split up among many different exchanges, resulting in multiple smaller transactions that each exchange a portion of the total amount of source token. Furthermore, one or more of those transactions could instead be performed with intermediary tokens (e.g., first exchanging the source token for an intermediate token instead of directly exchanging for the destination token) if the exchange rates associated with the intermediary tokens are favorable enough.

However, breaking up a transaction in this manner is easier said than done. At the planning stage, it must be quickly determined how to split up and organize the transaction in a manner that will optimize the amount of destination token received. This includes determining which exchanges to route orders to, how many tokens to allocate to each order, which intermediary tokens to involve, and so forth. Execution of the transaction must also be done quickly because the exchange rates between tokens will vary across exchanges and change rapidly over time. Any delay in planning or execution could result in the exchange rates changing drastically, which could result in the receipt of a suboptimal amount of destination token or require that the process be repeated. To add additional complexity to the matter, there may be variable transaction fees that must be accounted for to arrive at the optimal solution.

Accordingly, there exists a need for enabling large transactions to be performed with less slippage by planning and executing multi-route transfers (e.g., complex multi-token and/or multi-exchange transactions), in a manner that will optimize the amount of destination token received while accounting for transaction fees and complexity.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the embodiments described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

Systems and methods for dynamic multi-path transfers are disclosed herein. Advantageously, the systems disclosed herein for multi-route transfers as described herein can analyze every possible transfer to determine the best exchanges to use to transfer the source token to the destination token, and/or the best volume of the source token to transfer via each exchange to receive the largest volume of the destination token. The system for multi-route transfers can allow a user to transfer the source token on a plurality of exchanges simultaneously while receiving the largest volume of destination token. In some embodiments, the system for multi-route transfers can allow a user to transfer the source token to the destination via a plurality of intermediate assets to receive the largest volume of destination token.

The system for multi-route transfers can automatically determine a plurality of exchanges and/or intermediate tokens, from a datasource of exchanges and/or a datasource of tokens, that could be used to transfer the source token to the destination token. The system for multi-route transfer can automatically analyze combinations of exchanges, intermediate tokens, and/or volumes of source token to transfer via each exchange in a short period of time so that when the user executes the transfer, the exchange rates between the source token and the destination token are the same as the exchange rate between the source token and the destination token when the system for multi-route transfers determined the best exchanges to use to transfer the source token for the destination token, and/or the best volume of the source token to transfer via each exchange to receive the largest volume of the destination token. Accordingly, once the system generates an optimized multi-route transfer solution, it may send it to the user for review. The user may review the proposed multi-route transfer and choose to execute the transfer (e.g., signing the order/message to execute the order), and the system may execute the transfer in accordance with the accepted multi-route transfer solution.

A multi-route transfer of a source token for a destination token may be determined by analyzing a graph representing a plurality of tokens and exchanges to determine a plurality of unique transfer paths. A transfer path may reflect a direct transfer in which the source token is swapped for the destination token, or it may reflect a series of intermediate transfers in which the source token is swapped for intermediate token(s) that are swapped for the destination token. Dynamic programming can be used to select the transfer paths to include in the multi-route transfer, determine how to distribute swaps across those transfer paths, and determine how to distribute swaps for each transfer of a transfer path—thereby optimizing for the total amount of the destination token received while accounting for transaction fees.

In some embodiments, the multi-route transfer may be performed as part of a computer-implemented method performed by a swap platform. In some embodiments, the steps for the multi-route transfer may be performed by a computer system when executable code is executed by one or more processing devices of the computer system. In some embodiments, program instructions may stored on a non-transient computer readable medium that can be executed to cause a computer system to perform the steps for the multi-route transfer.

In some embodiments, the multi-route transfer may involve: receiving, from a user device of a user, an order to swap a starting amount of a source asset in exchange for a destination asset; selecting a subset of intermediate assets from a datasource of assets based on asset data; selecting a subset of exchanges from a datasource of exchanges based on the source asset, the destination asset, and exchange data; and generating a graph based on the subset of intermediate assets and the subset of exchanges. The graph may be a data structure comprising: a plurality of nodes. The plurality of nodes may comprise: a source node representing the source asset; a destination node representing the destination asset; and a plurality of intermediate nodes presenting the subset of intermediate assets. The data structure may further comprise a plurality of directed edges linking the plurality of nodes, wherein each edge links a pair of nodes and represents a transfer from a first asset represented by a first node of the pair to a second asset represented by a second node of the pair.

In some embodiments, the multi-route transfer may further involve: traversing the graph along every unique path from the source node to the destination node to evaluate a set of transfer paths, wherein each transfer path exchanges a portion of the starting amount of the source asset for an amount of the destination asset; ranking the set of transfer paths based on the respective amount of destination asset received after transaction fees by each transfer path in the set of transfer paths; determining a multi-route transfer comprising a combination of non-conflicting transfer paths that optimize a total amount of destination asset exchanged for the starting amount of the source asset after transaction fees, wherein the combination of non-conflicting transfer paths are selected from the set of transfer paths based on the ranking; sending, to the user device, data indicating the multi-route transfer and the combination of transfer paths; receiving, from the user device, a user input to execute the multi-route transfer; and executing the multi-route transfer.

In some embodiments, the subset of intermediate assets is selected from the datastore of assets based on the source asset and the destination asset indicated in the order. In some embodiments, at least one transfer path in the set of transfer paths comprises a direct transfer. In some embodiments, at least one transfer path in the set of transfer paths comprises an intermediate transfer. In some embodiments, evaluating the set of transfer paths is based on dynamic programming. In some embodiments, the number of intermediate nodes in the plurality of intermediate nodes is bound by a max number. In some embodiments, the source asset and the destination asset are both cryptocurrency tokens.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1A:
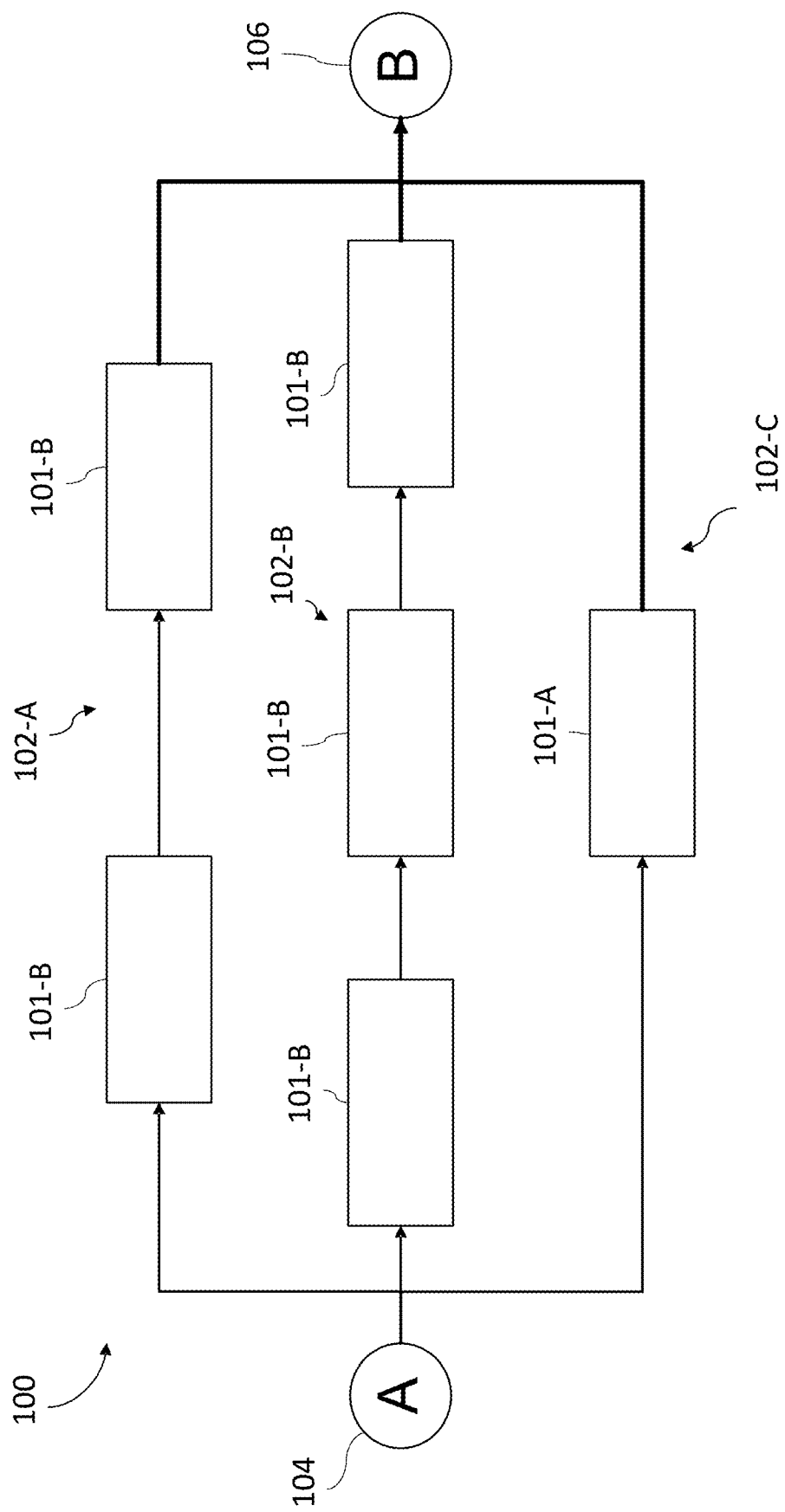
FIG. 1A is a schematic of a multi-route transfer according to some embodiments herein.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

"Gas" is a term of art that is often used to refer to a transaction fee for compensating miners/validators of a Ethereum Virtual Machine (EVM) compatible blockchain network in exchange for their computational effort of mining and processing blocks on the blockchain. However, the inventions disclosed herein may be applicable to other blockchain networks and implementations. Accordingly, the term "gas" may also broadly refer to any fee that enables users to conduct transactions or execute contracts on a blockchain network or to any fee that could incentivize an entity or participant to process transactions on a blockchain.

The term "transaction fee" is to be broadly construed and covers all types of non-slippage costs observed in a transaction. Examples of transaction fees may include gas fees, fees charged by exchanges that are based on transactions (e.g., on a per-swap basis), fees charged by exchanges that are not based on transactions (e.g., membership fees), and so forth.

The term "users" may refer to any person seeking to swap an initial amount of a source asset for a destination asset, such as by submitting a token swap order to a swap platform.

The terms "source token" and "source asset" are used synonymously to refer to a type of starting token that a user is seeking to swap away to end up with a different type of token at the end. Conceptually, it may represent the initial starting point for a multi-route transfer.

The terms "input token" and "input asset" are used synonymously to refer to a type of starting token in an incremental transfer in a transfer path of a multi-route transfer. It could be a source token or source asset (e.g., if it is associated with the first transfer in a transfer path), but it could also be an intermediate token or asset.

The terms "destination token" and "destination asset" are used synonymously to refer to a type of ending token that a user is seeking to end up with after the multi-route transfer has been completed. Conceptually, it may represent the ending point for a multi-route transfer.

The terms "output token" and "output asset" are used synonymously to refer to a type of ending token in an incremental transfer in a transfer path of a multi-route transfer. It could be a destination token or destination asset (e.g., if it is associated with the last transfer in a transfer path), but it could also be an intermediate token or asset.

The terms "transfer," "transaction," "exchange," and "swap," may be used interchangeably to refer to a swap of an amount of an input asset for some amount of an output asset.

The term "direct transfer" may refer to a swap in which a source asset is directly swapped for a destination asset.

The term "intermediate transfer" or "bridge transfer" may refer to a swap in a series of swaps, in which an intermediary asset is involved in some capacity instead of directly swapping the source asset for the desired destination asset.

The terms "intermediary asset", "intermediary token," "bridge asset," "bridge token," "connector token," and "connector asset" may be used interchangeably to refer to an asset involved in an intermediate transfer or bridge transfer of a multi-route transfer (e.g., neither the source asset or the destination asset).

The term "exchange" may be used: (1) to refer to a transfer or transaction (in which one type of asset is exchanged for another type of asset); (2) to refer to centralized or decentralized exchanges that enable such transactions to be executed; or (3) as part of the term "exchange rate," which is a metric often associated with such transactions. This application aims to avoid using the term wherever possible to improve clarity, but the term can still be found throughout the application. In such cases, the intended meaning of the term should be discerned based on context clues.

The terms "route," "path," "transfer path," and "link" may be used interchangeably to refer to a way or course to swap from a source asset to a destination asset using a series of transfers. For example, it may be a sequence of directed edges in a graph that begins at a source asset node and ends at a destination asset node.

The terms "abstraction," "representation," and "graph" are used herein to refer to a graph from the field of graph theory, which may be an abstract way to represent the possible tokens, exchanges, and liquidity sources that may be involved in a multi-route transfer.

The terms "hop," "edge," "segment," or "transfer" may be used interchangeably to refer to an incremental transaction performed as part of a transfer path.

The term "datasource" may refer to any computer-based source of electronic information, including data stores, databases, memory, in-memory data stores, and so forth.

As previously discussed, a user seeking to transact with a large amount of a digital asset, such as a blockchain-based cryptocurrency token, can lose a substantial fraction of the total transaction amount to slippage, since the large volume of the transaction is more likely to impact market prices and the observed exchange rate. For example, a user seeking to swap a large amount of a source token for a destination token may experience this, resulting in an observed exchange rate that is lower than the exchange rate expected by the user.

It should be noted that a similar issue exists in traditional finance (e.g., stocks), in which an asset is traded on a single, centralized exchange and the majority of liquidity sources (e.g., market makers) participate on that single exchange. One approach to minimize slippage for large transactions in that context is to conduct the transaction off-exchange (e.g., by locating a direct counterparty via a sell-side institutional trading desk), but that approach is not broadly available (e.g., it relies on existing relationships) and can still result in unfavorable prices (e.g., depending on the negotiated price). Another approach used to minimize market impact is to break up the large transaction into many smaller pieces that are trickled out for execution over a period of time. However, this can still result in unfavorable prices. In reality, neither of these approaches directly address the issue—instead, the would-be slippage that a large transaction would experience is exchanged away for other kinds of risks and losses (e.g., to counterparty or time).

In order to optimize the exchange rate and the amount of destination token received from such transactions, the systems and methods disclosed herein contemplate splitting up the transaction among many different exchanges, resulting in multiple smaller transactions that each swap a portion of the total amount of source token. Furthermore, one or more of those transactions could instead be performed with intermediary tokens (e.g., first exchanging the source token for an intermediate token instead of directly exchanging for the destination token) if the exchange rates associated with the intermediary tokens are favorable enough.

In some embodiments, the systems and methods disclosed herein are able to quickly determine how to split up and organize the transaction in a manner that will optimize the amount of destination token received. This includes determining which exchanges to route orders to, how many tokens to allocate to each order, which intermediary tokens to involve, and so forth. In some embodiments, the systems and methods disclosed herein are also able to execute the transaction quickly, before the exchange rates between tokens (which vary rapidly over time) change significantly. Any delay in planning or execution could result in the exchange rates changing drastically, which could result in the receipt of a suboptimal amount of output token or require that the process be repeated.

In some embodiments, the systems and methods disclosed herein may be able to account for variable transaction fees to arrive at the optimal solution. In other words, these systems and methods may enable large transactions to be performed with less slippage by planning and executing multi-route transfers (e.g., complex multi-token and/or multi-exchange transactions), in a manner that will optimize the amount of destination token received while accounting for transaction fees and complexity.

Aspects of the inventions disclosed herein involve specific implementations for addressing these problems and provide practical and technological benefits, such as providing price improvement on user submitted orders, especially large transactions. In particular, the systems for multi-route transfers disclosed herein can analyze every possible transfer to determine the best exchanges to use to transfer the source asset to the destination asset, and/or the best volume of the source asset to transfer via each exchange to receive the largest volume of the destination asset. The system for multi-route transfers can allow a user to transfer the source asset on a plurality of exchanges simultaneously while receiving the largest volume of destination asset. In some embodiments, the system for multi-route transfers can allow a user to transfer the source asset to the destination via a plurality of intermediate assets in order to receive the largest volume of destination asset.

In some embodiments, the system for multi-route transfers can automatically determine a plurality of exchanges and/or intermediate assets, from a datasource of exchanges and/or a datasource of assets, that could be used to transfer the source asset to the destination asset. The system for multi-route transfer can automatically analyze combinations of exchanges, intermediates assets, and/or volumes of source token to transfer via each exchange in a short period of time so that when the user executes the transfer, the transfer rates between the source asset and the destination asset are the same as the transfer rate between the source asset and the destination asset when the system for multi-route transfers determined the best exchanges to use to transfer the source asset to the destination asset, and/or the best volume of the source asset to transfer via each exchange to receive the largest volume of the destination asset.

In some embodiments, a system for multi-route transfers may comprise an artificial intelligence and/or machine learning (AI/ML) algorithm. In some embodiments, the AI/ML algorithm may automatically and dynamically determine a transfer path from a source asset to a destination asset. In some embodiments, the transfer path may include one or more intermediary assets between the source asset and the destination asset. In some embodiments, the term asset used herein may comprise a cryptocurrency asset, a token, a currency, money, a stock, property, real property, a bond, a fund, one or more fiat currencies and/or any other type of asset, for example, Ethereum, Bitcoin, 1 INCH Token, Tether USD, USD Coin, Binance USD, Matic Token, stETH, SHIBA INU, Dai Stablecoin, Uniswap, Wrapped BTC, Wrapped TON Coin, Chain Link, Quant, CRO, ApeCoin, Lido DAO Token, Mana, Aave Token, SAND, Frax, Axie Infinity Shred, PAX Dollar, True USD, HuobiToken, chiliZ, Rocket Pool Protocol, Decentralized USD, Graph Token, BitTorrent, Frax Share, Maker, etc.

In some embodiments, the transfer path may comprise between 0 intermediary assets and 1,000 intermediary assets. For example, in some embodiments, the transfer path may comprise 1, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, 125, 150, 175, 200, 250, 300, 350, 400, 450, 500, 600, 700, 800, 900, or 1,000 intermediary assets, or any value between the aforementioned values.

In some embodiments, the transfer path may comprise at least one transfer from the source asset to one of the one or more intermediary assets. In some embodiments, the transfer path may comprise at least one transfer from one of the one or more intermediary assets to the destination asset. In some embodiments, the transfer path may comprise at least one transfer from one of the one or more intermediary assets to another one of the one or more intermediary assets.

In some embodiments, the AI/ML algorithm can determine the transfer path based at least in part on one or more of exchange rates, trading fees, and/or settlement fees. In some embodiments, the AI/ML algorithm may automatically optimize the one or more exchange rates to maximize the amount of the destination asset received in the swap of the source asset.

In some embodiments, the AI/ML algorithm may determine a plurality of direct transfers to facilitate the swap of the source asset for the destination asset. In some embodiments, each of the plurality of direct transfers can include a first asset and a second asset. In some embodiments, the AI/ML algorithm can automatically analyze a plurality of decentralized exchanges to determine a best input volume of the first asset that corresponds to a transfer between the first asset and the second asset via each of the plurality of decentralized exchanges with a predetermined output volume of the second asset. In some embodiments, the AI/ML algorithm can automatically determine the best input volume of the first asset based on determining which exchange provides the optimal exchange rate, the lowest trading fee, and/or the lowest settlement fee. In some embodiments, each direct transfer can include a plurality of transfers between the first asset and the second asset via the plurality of decentralized exchanges. In some embodiments, each direct transfer can include a transfer between the first asset and the second asset via one or more of the plurality of decentralized exchanges. In some embodiments, the best input volume of each transfer between the first asset and the second asset can include a same volume; for example, a first best input volume of the first asset transferred to the second asset via a first exchange can include a same volume of the first asset as a second best input volume of the first asset transferred to the second asset via a second exchange.

Some embodiments herein are directed to systems, methods, and devices for dynamic multi-path asset transfers. More specifically in some embodiments, systems, methods, and devices are provided for analyzing a plurality of exchanges and/or a plurality of assets to determine a multi-path asset transfer that maximizes the returned volume of a destination asset for a given volume of source asset. In some embodiments, the systems and methods may determine a multi-path asset transfer that maximizes the returned volume of a destination asset for a given volume of source asset while taking into account the transaction fees (e.g., gas fees) associated with the various proposed transfer paths of the multi-path transfer.

In some embodiments, a system for multi-route asset transfer may comprise a computer system and/or an algorithm. In some embodiments, the computer system and/or the algorithm can determine a multi-route asset transfer of a source asset for a destination asset. In some embodiments, the computer system and/or the algorithm may generate a graph or other abstraction of the transfer path to facilitate and maximize the return of the destination asset in exchange for the source asset. In some embodiments, the abstraction may include one or more nodes and/or one or more edges. In some embodiments, each node may represent an asset. In some embodiments, at least one of the nodes may represent the source asset. In some embodiments, at least one of the nodes may represent the destination asset. In some embodiments, each node may be connected to one or more other nodes via an edge. In some embodiments, each edge may represent an exchange, such as a decentralized currency or asset exchange, or a plurality of exchanges that may perform a transfer between each node (i.e., asset) connected by the edge.

In some embodiments, the nodes may represent a subset of assets from a datasource of assets. In some embodiments, the subset of assets may be predetermined by the system. In some embodiments, the subset of assets can be determined based on the identity and/or properties of the source asset and/or the identity and/or properties of the destination asset. In some embodiments, the computer system and/or the algorithm can dynamically determine the subset of assets based on a liquidity volume of each of the assets in the datasource of assets, a value of each of the assets in the datasource of assets, the identity and/or properties of the source asset, the identity and/or properties of the destination asset, an exchange rate between the source asset and one or more of the assets in the datasource of assets, an exchange rate between the destination asset and one or more of the assets in the datasource of assets, an exchange rate between assets in the datasource of assets, and/or any other asset or exchange data. In some embodiments, the computer system and/or the algorithm can dynamically determine the subset of assets based on a previous liquidity volume of each of the assets stored in the datasource of assets, a previous value of each of the assets in the datasource of assets, a previous exchange rate between the source asset and one or more in the assets of the datasource of assets, a previous exchange rate between the destination asset and one or more of the assets in the datasource of assets, a previous exchange rate between assets in the datasource of assets, and/or any other asset data or exchange data at a previous time.

In some embodiments, the datasource of assets is continuously or periodically updated in real-time with new asset and/or exchange data. For example, in some embodiments, the datasource of assets may be continuously updated at a nanosecond time scale using one or more data sources. In other embodiments, the datasource of assets may be periodically updated at a constant rate, such as between once per millisecond and once per week. For example, the datasource of assets may be updated every 1 millisecond, 10 milliseconds, 100 milliseconds, 1 second, 10 seconds, 30 seconds, 1 minute, 10 minutes, 30 minutes, 1 hour, 2 hours, 3 hours, 4 hours, 24 hours, 2 days, 3 days, 4 days, 5 days, 6 days, or 1 week, and/or between any of the aforementioned time periods.

In some embodiments, the computer system and/or the algorithm can dynamically determine the subset of assets based on a predicted liquidity volume of each of the assets in the datasource of assets, a predicted value of each of the assets in the datasource of assets, a predicted exchange rate between the source assets and one or more of the assets in the datasource of assets, a predicted exchange rate between the destination asset and one or more of the assets in the datasource of assets, a predicted exchange rate between assets in the datasource of assets, and/or any other future asset and/or exchange data predictions.

In some embodiments, the edges of the abstraction may represent a subset of exchanges from a datasource of exchanges. In some embodiments, the subset of exchanges can be predetermined. In some embodiments, the subset of exchanges can be determined based on the source asset, the destination asset, and/or a volume of the source asset. In some embodiments, the computer system and/or algorithm can determine the subset of exchanges based on a total liquidity volume of each of the exchanges in the datasource of exchanges, a liquidity volume of the source asset of each of the exchanges in the datasource of exchanges, a liquidity of the destination asset of each of the exchanges in the datasource of exchanges, a transfer volume of each of the exchanges in the datasource of exchanges, an exchange fee of each of the exchanges in the datasource of exchanges, and/or any other exchange data.

In some embodiments, the computer system and/or algorithm can determine the subset of exchanges based on a previous total liquidity volume of each of the exchanges in the datasource of exchanges, a previous liquidity volume of the source asset of each of the exchanges in the datasource of exchanges, a previous liquidity of the destination asset of each of the exchanges in the datasource of exchanges, a previous transfer volume of each of the exchanges in the datasource of exchanges, previous transfers of each of the exchanges in the datasource of exchanges, a previous exchange fee of each of the exchanges in the datasource of exchanges, and/or any other past exchange data. In some embodiments, the computer system and/or algorithm can determine the subset of exchanges based on a predicted total liquidity volume of each of the exchanges in the datasource of exchanges, a predicted liquidity volume of the source asset of each of the exchanges in the datasource of exchanges, a predicted liquidity of the destination asset of each of the exchanges in the datasource of exchanges, a predicted exchange fee of each of the exchanges in the datasource of exchanges a predicted transfer volume of each of the exchanges in the datasource of exchanges, and/or any other predicted exchange data.

In some embodiments, the computer system and/or the algorithm can determine one or more paths or links in the abstraction from the source token to the destination token, wherein a path or a link comprises a route from the source token to the destination token via edges. In some embodiments, the computer system and/or algorithm can analyze each path or link to determine a multi-route transfer or swap. In some embodiments, the computer system and/or algorithm can analyze each path or link, each combination of paths or links, and/or each set, wherein a set comprises a pair of nodes connected by an edge. In some embodiments, each set may represent a transfer from an input asset to an output asset via the one or more exchanges represented by the edge. In some embodiments, the computer system and/or the algorithm may determine a distribution of each set, wherein the distribution is a percentage or portion of a volume of the input asset of each set that is transferred to the output asset via each exchange. In some embodiments, each input asset may be split into multiple volumes and each volume may be transferred to a different output asset via the same exchange or different exchanges. For example, the input asset may be split into a first volume, a second volume, and a third volume, and the first volume of the input asset may be transferred to a first output asset via a first exchange, the second volume of the input asset may be transferred to a second output asset via the first exchange, and the third volume of the input asset may be transferred to the first output asset via a second exchange. In some embodiments, the input asset may be transferred to one or more output assets via one or more exchanges. In some embodiments, the computer system and/or the algorithm may determine a distribution of each set that results in the largest volume of output asset. In some embodiments, the computer system and/or the algorithm can determine a distribution of each set that results in the smallest loss in value. In some embodiments, the loss in value may result from a change in exchange rate between the input asset and the output asset on each exchange based on a transfer from the input asset to the output asset. In some embodiments, a loss in value may result from a relative change in value of the input asset and the output asset, third party trades between the input asset and the output asset on one or more exchanges, a change in volume of the input asset and/or the output asset on each exchange. In some embodiments, the loss in value on each exchange based on the transfer from the input asset to the output asset may be different. In some embodiments, the loss in value on each exchange may depend on a total volume of the input asset and/or the output asset on each exchange, a volume of the input asset and/or the output asset transferred on each exchange, and/or a transfer fee of each exchange. In some embodiments, a number of exchanges included in the distribution of each set may be based on a volume of the source asset and/or a volume of the input asset. In some embodiments, the computer system and/or the algorithm can analyze each set of a path or link starting with a set that includes the source asset. In some embodiments, the computer system and/or the algorithm can analyze the next set, wherein the next set is a set where the input asset comprises the output asset of a previous set. In some embodiments, the computer system and/or the algorithm can analyze each next set until the destination asset is reached.

In some embodiments, the computer system and/or the algorithm may generate an abstraction of every combination or a subset of combinations of every path or link between the source asset and the destination asset. In some embodiments, the number of paths or links in each combination may be based on the volume of the source asset. In some embodiments, the computer system and/or the algorithm can determine the combination of paths or links that results in the largest volume of destination asset. In some embodiments, the combination of paths or links that result in the largest volume of destination asset may be a combination of paths or links that results in the smallest loss of value.

In some embodiments, the combination of paths or links that results in the largest volumes of destination asset may comprise a multi-route transfer. In some embodiments, the multi-route transfer may include an atomic transfer or an atomic swap, wherein an atomic transfer or an atomic swap is a transfer or a swap that can be automatically cancelled or reversed if the transfer or the swap is not completed within a predetermined time. In some embodiments, an atomic transfer or an atomic swap may include a transfer or a swap that can be automatically cancelled or reversed if every condition or step of a smart contract for the transfer is not completed within a predetermined time. In some embodiments, an atomic transfer or an atomic swap may include hash timelock contract technology (HTCL) that requires verification from each party of a transfer for the transfer to be completed. In some embodiments, an atomic transfer or an atomic swap may include a transfer between multiple blockchains.

In some embodiments, a system for multi-route transfer may analyze, for example, hundreds of exchanges and/or thousands of assets to determine or generate a multi-route transfer with a largest volume of a destination asset for a particular volume of source asset. In some embodiments, the systems and methods for multi-route transfer may comprise analyzing hundreds and/or thousands of paths or link to determine or generate a multi-route transfer with the largest volume of destination asset. In some embodiments, the system for multi-route transfer must determine or generate a multi-route transfer in a short period of time, for example, 1 second, 2 seconds, 3 seconds, 4 seconds, 5 seconds, 6 seconds, 7 seconds, 8 seconds, 9 seconds, 10 seconds, 12 seconds, 15 seconds, 20 seconds, 25 seconds, 30 seconds, 35 seconds, 40 seconds, 45 seconds, 50 seconds, 55 seconds, 1 minute, 1 minute and 15 seconds, 1 minute and 30 seconds, 1 minute and 45 seconds, 2 minutes, and/or any value between the aforementioned values, in order for a transfer executed via the multi-route transfer to result in the largest volume of destination token.

In some embodiments, a system for multi-route transfer can reduce or minimize loss of volume and/or a change in the exchange rate between the source asset and the destination asset, or between one or more of the input assets and one or more of the output assets, on one or more exchanges. In some embodiments, a system for multi-route transfer can execute transfers or swaps on a plurality of exchanges simultaneously. In some embodiments, a system for multi-route transfer can use a plurality of exchanges for one transfer or swap between a source asset and a destination asset. In some embodiments, the system for multi-route transfer can use a plurality of exchanges and/or transfer paths to transfer multiple source assets to one destination asset. In some embodiments, the system for multi-route transfer can use a plurality of exchanges and/or transfer paths to transfer one source asset to multiple destination assets.

In some embodiments, the systems and methods described herein may be implemented on a swap platform, such as the swap platforms described in U.S. patent application Ser. No. 18/408,376, filed on Jan. 9, 2024 and entitled "GASLESS DECENTRALIZED TOKEN SWAPS," the contents of which are hereby incorporated by reference in its entirety.

FIG. 1A shows a schematic of an example multi-route transfer 100 of a source asset 104 (e.g., input token 'A') to a destination asset 106 (e.g., input token 'B').

The multi-route transfer 100 may include one or more transfer paths 102 from the source asset 104 to the destination asset 106. In some embodiments, the multi-route transfer 100 can involve swapping an initial amount of the source asset 104 for some amount of the destination asset 106 using multiple routes or paths (e.g., the transfer paths 102). In some embodiments, the amount or volume of the source asset 104 to be swapped can be predetermined (e.g., it is known at the start).

As shown in the figure, the multi-route transfer 100 has three unique transfer paths 102 (e.g., transfer paths 102-A, 102-B, and 102-C). In some embodiments, the multi-route transfer 100 can include one (1), two (2), three (3), four (4), five (5), six (6), seven (7), eight (8), nine (9), and/or ten (10) transfer paths 102. In some embodiments, the multi-route transfer 100 can include between one (1) and ten (10) transfer paths 102. In some embodiments, the multi-route transfer 100 can include between two (2) and five (5) transfer paths 102. In some embodiments, the multi-route transfer 100 can include more than ten (10) transfer paths 102. In some embodiments, the multi-route transfer 100 can include 15 transfer paths 102, 20 transfer paths 102, 25 transfer paths 102, 30 transfer paths 102, 40 transfer paths 102, 45 transfer paths 102, 50 transfer paths 102, and/or any value between the aforementioned values.

In some embodiments, the total amount of source asset 104 to be exchanged for the destination asset 106 can be split up and distributed across multiple transfer paths 102. There can be many ways for determining the amount (e.g., the portion) of source asset 104 to allocate to each of the transfer paths 102. For example, in some embodiments, the initial amount of source asset 104 can be equally distributed over all the transfer paths 102. In other words, each of the transfer paths 102 may involve swapping the same amount of the source asset 104. In some embodiments, the initial amount of source asset 104 may not be equally distributed over all the transfer paths 102. In other words, each of the transfer paths 102 may involve swapping a different amount of the source asset 104.

In some embodiments, the system may determine the amount (e.g., the portion) of source asset 104 to swap via each of the transfer paths 102 that will optimize the total amount of destination asset 106 that will be received. In other words, the system may balance the amounts of source asset 104 swapped across each of the transfer paths 102, in a way that will result in the best overall exchange rate from all the transfer paths 102 combined. The solution may reduce the negative impact to price or exchange rate that is expected to be observed from each transfer path 102.

In some embodiments, the system may determine both the structure of the multi-route transfer 100 (e.g., each of the unique transfer paths 102 between the source asset 104 and the destination asset 106) and the amount of the source asset 104 to swap via each of the selected transfer paths 102. In some embodiments, the system may consider the additional constraint of variable transaction fees, which may increase with the complexity of the multi-route transfer 100 (e.g., the number of transfer paths 102, the complexity of each transfer path 102, etc.). In some embodiments, the system may determine a solution that will optimize the total amount of destination asset 106 that will be received through the transfer paths 102 while taking into account transaction fees. Accordingly, the system may tend to shy away from very complex multi-route transfers (e.g., involving many transfer paths 102 and/or intermediate assets) that may be suboptimal due to transaction fees.

In some embodiments, the amount of source asset 104 to swap via each of the transfer paths 102 may be automatically and/or dynamically determined in real time or substantially real time. In some embodiments, the amount of source asset 104 to swap via each of the transfer paths 102 may be automatically and/or dynamically determined periodically. In some embodiments, the amount of source asset 104 to swap via each of the transfer paths 102 may be automatically and/or dynamically determined periodically until a user decides to execute the multi-route transfer 100. In some embodiments, the amount of the source asset 104 to swap via each of the transfer paths 102 may be automatically and/or dynamically determined about every 1 second, 2 seconds, 3 seconds, 4 seconds, 5 seconds, 6 seconds, 7 seconds, 8 seconds, 9 seconds, 10 seconds, 12 seconds, 15 seconds, 20 seconds, 25 seconds, 30 seconds, 35 seconds, 40 seconds, 45 seconds, 50 seconds, 55 seconds, 1 minute, 1 minute and 15 seconds, 1 minute and 30 seconds, 1 minute and 45 seconds, 2 minutes, and/or any value between the aforementioned values.

Figure 1B:
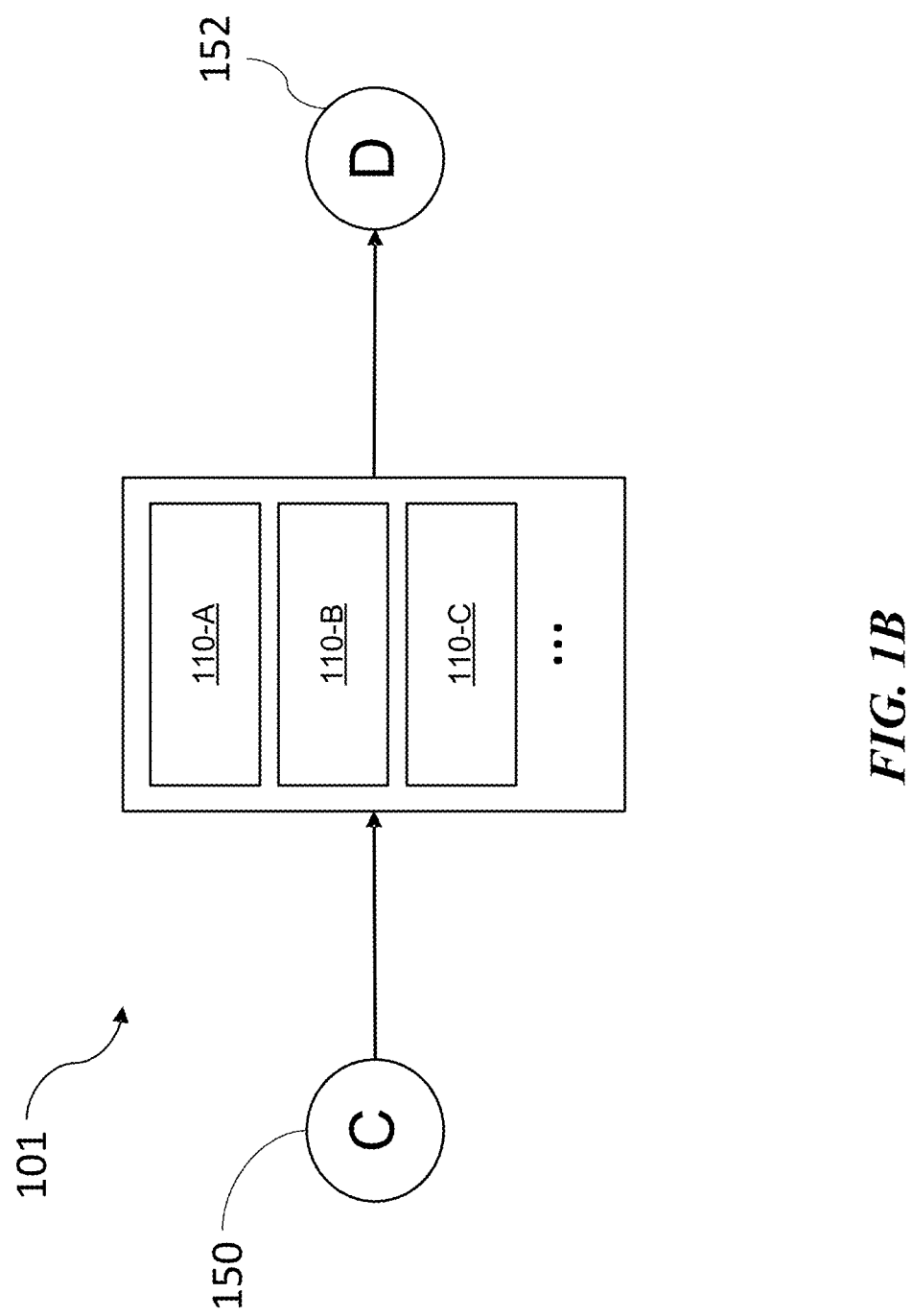
FIG. 1B is a schematic of a transfer along a transfer path according to some embodiments herein.

In some embodiments, a transfer path 102 can include one or more transfers 101 (FIG. 1B describes and depicts a transfer 101 in more detail). In some embodiments, a transfer path 102 may comprise a single transfer 101, which can be a direct transfer (e.g., the source asset 104 is directly swapped for the destination asset 106). For example, as depicted in the figure, the transfer path 102-C comprises a direct transfer 101-A.

In some embodiments, a transfer path 102 may comprise multiple transfers 101, which can be considered intermediate transfers or bridge transfers (e.g., involving an intermediary asset, as opposed to a direct swap from the source asset 104 to the destination asset 106). For example, as depicted in the figure, the transfer path 102-A comprises two intermediate transfers 101-B which implies a swap to/from an intermediary asset (not shown). The transfer path 102-B is shown with three intermediate transfers 101-B which implies a swap to/from two different intermediary assets (not shown).

In some embodiments, the transfer paths 102 can include two or more intermediate transfers 101-B. In some embodiments, a transfer path 102 can include two (2), three (3), four (4), five (5), six (6), seven (7), eight (8), nine (9), and/or ten (10) intermediate transfers 101-B. In some embodiments, each the transfer path 102 can include between one (1) and ten (10) intermediate transfers 101-B. In some embodiments, a transfer path 102 can include between two (2) and five (5) intermediate transfers 101-B. In some embodiments, a transfer path 102 can include more than ten (10) intermediate transfers 101-B. In some embodiments, a transfer path 102 can include 15 intermediate transfers 101-B, 20 intermediate transfers 101-B, 25 intermediate transfers 101-B, 30 intermediate transfers 101-B, 40 intermediate transfers 101-B, 45 intermediate transfers 101-B, 50 intermediate transfers 101-B, 60 intermediate transfers 101-B, 70 intermediate transfers 101-B, 80 intermediate transfers 101-B, 90 intermediate transfers 101-B, 100 intermediate transfers 101-B, 200 intermediate transfers 101-B, 300 intermediate transfers 101-B, 400 intermediate transfers 101-B, 500 intermediate transfers 101-B, 600 intermediate transfers 101-B, 700 intermediate transfers 101-B, 800 intermediate transfers 101-B, 900 intermediate transfers 101-B, 1,000 intermediate transfers 101-B, 5,000 intermediate transfers 101-B, 10,000 intermediate transfers 101-B and/or any value between the aforementioned values. In some embodiments, each transfer path 102 may comprise a same number of intermediate transfers 101-B. In some embodiments, each transfer path 102 may comprise a different number of intermediate transfers 101-B. In some embodiments, one or more of the transfer paths 102 may comprise a same number of intermediate transfers 101-B. In some embodiments, one or more of the transfer paths 102 may comprise a different number of intermediate transfers 101-B.

In some embodiments, the multi-route transfer 100 may be an atomic transfer, wherein an atomic transfer is a transaction that may be cancelled or reversed if the transaction cannot be completed or if the transaction cannot be completed within a predetermined time. For example, the multi-route transfer 100 may be cancelled or reversed if one or more of the transfers 101 and/or transfer paths 102 cannot be completed. In some embodiments, if any transfer paths 102, any transfers 101, any direct transfers 101-A, and/or any intermediate transfer 101-B of the multi-route transfer 100 cannot be performed or completed, the multi-route transfer 100 may be cancelled or reversed. In this way, if a user attempts to execute a multi-route transfer 100 to swap an initial amount of the source asset 104 and the multi-route transfer 100 cannot be performed or completed, then the user retains the initial amount of the source asset 104 and the user does not receive any of the intermediate assets or the destination asset 106 associated with the multi-route transfer 100.

FIG. 1B is a schematic of a transfer along a transfer path (e.g., one of the transfers 101 in one of the transfer paths 102 shown in FIG. 1A).

As shown in FIG. 1B, in some embodiments, a transfer 101 may comprise a swap from an input asset 150 (e.g., input token 'C') to an output asset 152 (e.g., output token 'D'). In some embodiments, the transfer 101 may be a direct transfer 101-A (as shown in FIG. 1A). In some cases, the input asset 150 may correspond to the source asset 104 from FIG. 1A, and/or the output asset 152 may correspond to the destination asset 106 from FIG. 1A. For example, if the transfer 101 shown in FIG. 1B corresponds to the direct transfer 101-A taken in transfer path 102-C of FIG. 1A, then the input asset 150 can be the source asset 104 and the output asset 152 can be the destination asset 106.

In some embodiments, the transfer 101 may be an intermediate transfer 101-B (as shown in FIG. 1A). Accordingly, the input asset 150 may correspond to the source asset 104 from FIG. 1A or an intermediate asset, and the output asset 152 may correspond to the destination asset 106 from FIG. 1A or an intermediate asset. For example, if the transfer 101 shown in FIG. 1B corresponds to the first intermediate transfer 101-B at the beginning of transfer path 102-B of FIG. 1A, then the input asset 150 would be the source asset 104 and the output asset 152 would be an intermediate asset. Alternatively, if the transfer 101 shown in FIG. 1B corresponds to the intermediate transfer 101-B in the middle of transfer path 102-B, then the input asset 150 would be an intermediate asset (not shown in FIG. 1A) and the output asset 152 would also be an intermediate asset (not shown in FIG. 1A).

Accordingly, in some embodiments, the input asset 150 of a direct transfer can be the source asset 104 and the output asset 152 can be the destination asset 106. In some embodiments, the input asset 150 of an intermediate transfer can be the source asset 104 and the output asset 152 may be an intermediate asset or a bridge asset, wherein the intermediate asset is neither the source asset 104 or the destination asset 106. In some embodiments, the input asset 150 may be a first intermediate asset and the output asset 152 may be a second intermediate asset. In some embodiments, the input asset 150 may be an intermediate asset and the output asset 152 may be the destination asset 106.

In some embodiments, a transfer 101 can be completed via one or more exchanges 110. In some embodiments, the one or more exchanges 110 can be centralized exchanges, decentralized exchanges, liquidity pools, smart contracts, and/or any other type of liquidity source. In some embodiments, the transfer 101 can be completed via a single exchange 110 and the entire starting amount of the input asset 150 can be swapped to the output asset 152 via that one exchange 110. In some embodiments, the transfer 101 can be completed via a plurality of exchanges 110, and each exchange may be used to swap a portion of the starting amount of the input asset 150 to the output asset 152. In some embodiments, each exchange (e.g., of the plurality of exchanges 110) may be used to swap an equal portion of the starting amount of the input asset 150 to the output asset 152. In some embodiments, each exchange (e.g., of the plurality of exchanges 110) may be used to swap differing portions of the starting amount of the input asset 150 to the output asset 152. In some embodiments, one or more equal portions of the volume of the input asset 150 can be swapped to the output asset 152 via one or more exchanges 110, and different portions of a remaining volume of the input asset 150 can be swapped to the output asset 152 via one or more other exchanges 110. For example, ten percent of the volume of the input asset 150 can be swapped to the output asset 152 via a first exchange 110-A, ten percent of the volume of the input asset 150 can be swapped to the output asset 152 via a second exchange 110-B, fifteen percent of the volume of the input asset 150 can be swapped to the output asset 152 via a third exchange 110-C, and sixty-five percent of the volume of the input asset 150 can be swapped to the output asset 152 via a fourth exchange (not shown).

Accordingly, for a transfer 101, the total amount of input asset 150 to be swapped for the output asset 152 may be split up and distributed across multiple exchanges 110. There can be many ways for determining the amount (e.g., the portion) of input asset 150 to allocate to each of the exchanges 110. For example, in some embodiments, the initial amount of input asset 150 can be equally distributed over all the selected exchanges 110. In other words, each of the exchanges 110 may handle swapping the same amount of the input asset 150. In some embodiments, the initial amount of input asset 150 may not be equally distributed over all the selected exchanges 110. In other words, each of the exchanges 110 may be used to swap a different amount of the input asset 150.

In some embodiments, the system may determine the amount (e.g., the portion) of input asset 150 to swap through each exchange 110 that will optimize the total amount of output asset 152 that will be received. In other words, the system may balance the amounts of input asset 150 swapped on each exchange 110, in a way that will result in the best overall exchange rate from all the exchanges 110 combined.

In some embodiments, the system may determine all the exchanges 110 for performing a transfer 101 (e.g., for swapping the input asset 150 for the output asset 152) in a transfer path 102, as well as the amount of input asset 150 that each exchange 110 should swap for the transfer 101. In some embodiments, the system may consider the additional constraint of variable transaction fees, which may increase with the complexity of the transfer 101 (e.g., the number of exchanges 110). In some embodiments, the system may determine a solution that will optimize the total amount of output asset 152 that will be received in the transfer 101 while taking into account transaction fees.

In some embodiments, the starting amount or volume of the input asset 150 being swapped for the output asset 152 can be predetermined. In some embodiments, the amount of the input asset 150 being swapped to the output asset 152 via each of the one or more exchanges 110 may be automatically and/or dynamically determined in real time or substantially real time. In some embodiments, the amount of the input asset 150 swapped to the output asset 152 via each of the one or more exchanges 110 may be automatically and/or dynamically determined periodically. In some embodiments, the amount of the input asset 150 swapped to the output asset 152 via each of the one or more exchanges 110 may be automatically and/or dynamically determined periodically until a user executes the multi-route exchange 100. In some embodiments, the amount of the input asset 150 swapped to the output asset 152 via each of the one or more exchanges 110 can be automatically and/or dynamically determined about every 1 second, 2 seconds, 3 seconds, 4 seconds, 5 seconds, 6 seconds, 7 seconds, 8 seconds, 9 seconds, 10 seconds, 12 seconds 15 seconds, 20 seconds, 25 seconds, 30 seconds, 35 seconds, 40 seconds, 45 seconds, 50 seconds, 55 seconds, 1 minute, 1 minute and 15 seconds, 1 minute and 30 seconds, 1 minute and 45 seconds, 2 minutes, and/or any value between the aforementioned values.

Figure 2:
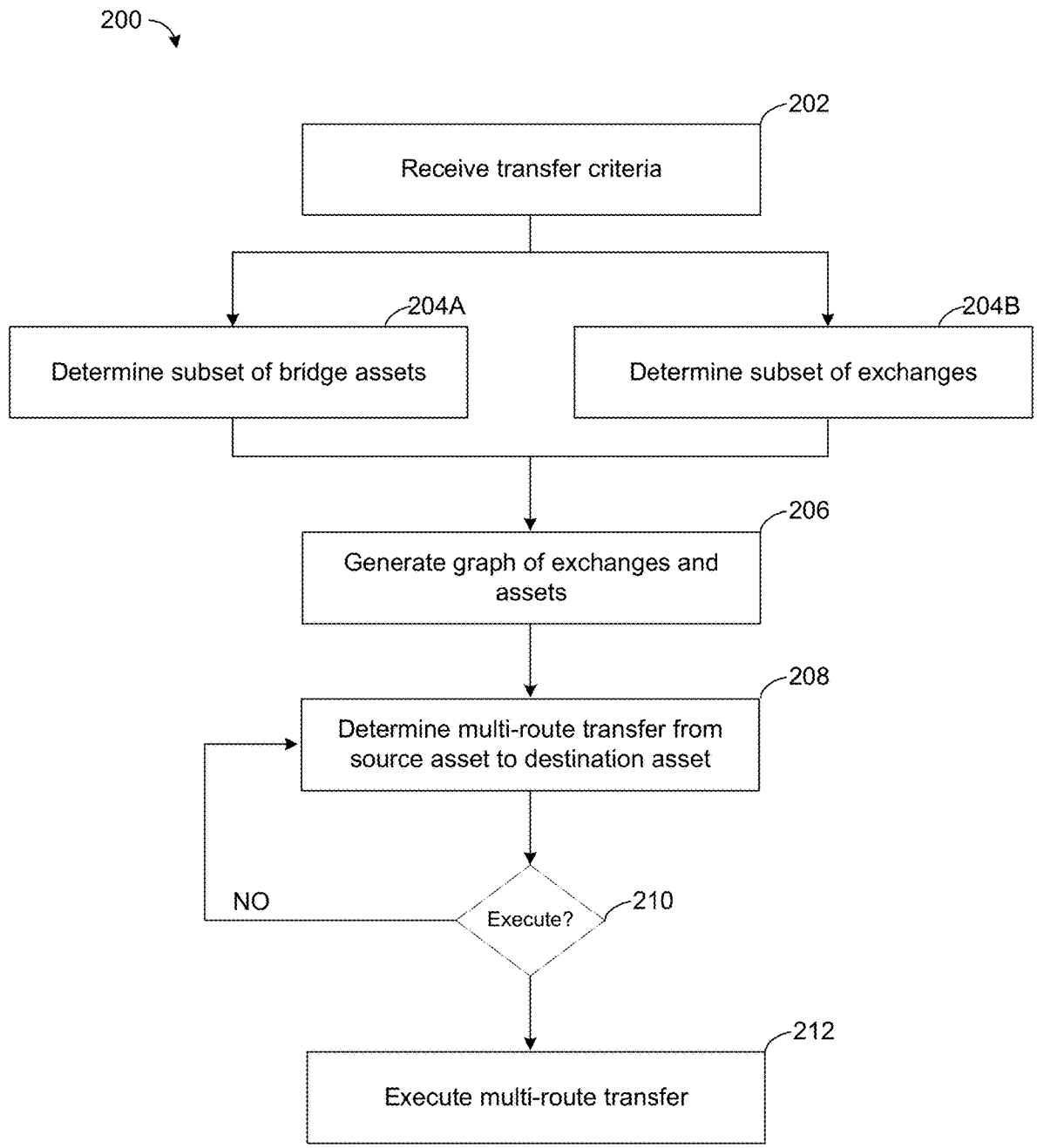
FIG. 2 is a flow chart of a method for routing (e.g., determining how to structure and organize) the swap of a source asset to a destination asset via a multi-route transfer according to some embodiments herein.

FIG. 2 shows a flow chart of a method 200 for routing (e.g., determining how to structure and organize) the swap of a source asset 104 to a destination asset 106 via a multi-route transfer 100. In some embodiments, at least a portion of the method 200 can be performed or completed via a computer system. In some embodiments, at least a portion of the method 200 can be performed or completed via an algorithm. In some embodiments, the algorithm may comprise artificial intelligence and/or machine learning (AI/ML) algorithm. In some embodiments, the algorithm can be a dynamic programming algorithm.

In some embodiments, at step 202 of method 200, the computer system and/or the algorithm may receive routing inputs (e.g., a set of transfer criteria). In some embodiments, the routing inputs may include a source asset 104, a starting amount or volume of the source asset 104, a destination asset 106, and/or a maximum acceptable loss of value or amount of slippage. In some embodiments, the routing inputs may include a route type. In some embodiments, the route type may comprise a market order, swap, a limit order, a timed limit order and/or any other route type. In some embodiments, a swap can include an instantaneous, a real time, and/or a substantially real time multi-route transfer 100 from a source asset 104 to a destination asset 106. In some embodiments, a limit order can include a multi-route exchange 100 from a source asset 104 to a destination asset 106 at a predetermined value of the source asset 104. In some embodiments, if the route type is a limit order, the computer system and/or the algorithm can execute or perform the multi-route transfer 100 when an exchange rate is at or above a predetermined threshold. In some embodiments, if the route type is a limit order, the computer system and/or the algorithm can execute or perform the multi-route transfer 100 when an exchange rate is at or below a predetermined threshold. In some embodiments, if the order type comprises a timed limit order, the computer system and/or algorithm may only complete the multi-route transfer 100 if the exchange rate is at or above a predetermined threshold during a specified period of time.

In some embodiments, at step 204A, the computer system and/or the algorithm can automatically and dynamically determine or select a subset of assets. For example, the subset of assets may comprise intermediate assets or bridge assets selected from a datasource of assets. This subset of assets may be involved in generating the graph used for analysis (e.g., the subset of assets may be the intermediate assets that correspond to the connector nodes in the graph). In some embodiments, the datasource of assets can include a plurality of assets. In some embodiments, the datasource of assets can include about 800 assets. In some embodiments, the datasource of assets can include about 100 assets, about 200 assets, about 300 assets, about 400 assets, about 500 assets, about 600 assets, about 700 assets, about 800 assets, about 900 assets, about 1,000 assets, about 1,500 assets, about 2,000 assets, about 2,500 assets, about 3,000 assets, about 4,000 assets, about 5,000 assets, about 6,000 assets, about 7,000 assets, about 8,000 assets, about 9,000 assets about 10,000 assets, about 15,000 assets, about 20,000 assets and/or any other value between the aforementioned values. In some embodiments, the datasource of assets can include more than 20,000 assets. In some embodiments, the datasource of assets can include less than 800 assets.

In some embodiments, the subset of assets can include about 5 assets, about 10 assets, about 15 assets, about 20 assets, about 25 assets, about 30 assets, about 35 assets, about 40 assets, about 45 assets, about 50 assets, about 60 assets, about 70 assets, about 80 assets, about 90 assets, about 100 assets, about 150 assets, about 200 assets, about 300 assets, about 400 assets, about 500 assets, and/or any other value between the aforementioned values. In some embodiments, the subset of assets can include more than 500 assets. In some embodiments, the subset of assets can include less than 5 assets. In some embodiments, the subset of assets can include between about 5 assets and about 50 assets. In some embodiments, the subset of assets can include between about 5 assets and about 20 assets. In some embodiments, the subset of assets can include between about 10 assets and about 15 assets.

In some embodiments, the computer system and/or the algorithm can determine or select which assets from the datasource of assets to include in the subset of assets. In some embodiments, the computer system and/or the algorithm can determine or select one or more of the assets from the datasource of assets to include in the subset of assets based on the source asset 104 and/or the destination asset 106 (e.g., indicated in the routing inputs).

There may be many different approaches that can be used to select the subset of assets. In some embodiments, one or more of the assets of the subset of assets may be predetermined based on the source asset 104 and/or the desired destination asset 106. For example, for a particular source asset and destination asset pair, the datasource of assets may specify a preset list of bridge assets to use. In some embodiments, the computer system and/or the algorithm can dynamically determine or select one or more assets from the datasource of assets to include in the subset of assets based on available asset data. In some embodiments, the asset data can include liquidity data or order book data associated with each of the assets in the datasource of assets (and/or the source/destination assets), a value associated with each of the assets in the datasource of assets (and/or the source/destination assets), an exchange rate between the source asset 104 and one or more of the assets in the datasource of assets, an exchange rate between the destination asset 106 and one or more of the assets in the datasource of assets, an exchange rate between assets in the datasource of assets, and/or any other asset data. In some embodiments, the liquidity data can include a total volume of an asset available for transfer or swap.

In some embodiments, the computer system and/or the algorithm can determine the subset of assets (e.g., the intermediate or bridge assets) based on past asset data. In some embodiments, the past asset data can include historic asset data, asset data over a period of time, and/or asset data at a previous time. The past asset data can include, previous liquidity data (previous liquidity volume) or order book data for each of the assets in the datasource of assets, a previous value associated with each of the assets in the datasource of assets, a previous exchange rate between the source asset 104 and one or more of the assets in the datasource of assets, a previous exchange rate between the destination asset 106 and one or more of the assets in the datasource of assets, a previous exchange rate between assets in the datasource of assets, and/or any other asset data at a previous time.

In some embodiments, the computer system and/or the algorithm can determine the subset of assets based on predicted asset data. In some embodiments, the computer system and/or algorithm can dynamically determine the predicted asset data. In some embodiments, the predicted assets data can be a prediction or determination of the asset data at a future time or a future period of time. In some embodiments, the predicted asset data can be based on the asset data and/or the past asset data in the datasource of assets. In some embodiments, the predicted asset data can include predicted liquidity data (e.g., a predicted liquidity volume) or predicted order book data for each of the assets in the datasource of assets, a predicted value associated with each of the assets in the datasource of assets, a predicted exchange rate between the source asset 104 and one or more of the assets in the datasource of assets, a predicted exchange rate between the destination asset 106 and one or more of the assets in the datasource of assets, a predicted exchange rate between assets in the datasource of assets, and/or any other future asset data predictions or determinations.

In some embodiments, the computer system and/or the algorithm can determine the subset of bridge assets to use based on a subset of bridge assets previously determined by the computer system and/or the algorithm. For example, a specific list of bridge assets may have been selected for a previous multi-route transfer of a particular source asset 104 for a particular destination asset 106, and that same list of bridge assets can be used again for a multi-route transfer involving the same source asset 104 and destination asset 106 pair. Accordingly, in some embodiments, the subsets of bridge assets previously determined by the computer system and/or the algorithm can include subsets of bridge assets used for past routing from the source asset 104, subsets of bridge assets used for past routing to the destination asset 106, subsets of bridge assets used for past routing from the source asset 104 to the destination asset 106, and/or any other subsets of bridge assets used for past routing.

In some embodiments, at step 204B, the computer system and/or the algorithm can automatically and/or dynamically determine a subset of exchanges from a datasource of exchanges. In some embodiments, the datasource of exchanges can specify a plurality of different exchanges and the assets associated with each exchange. In some embodiments, the datasource of exchanges can include about 20,000 exchanges. In some embodiments, the datasource of exchanges can include about 1,000 exchanges, about 2,000 exchanges, about 3,000 exchanges, about 4,000 exchanges, about 5,000 exchanges, about 10,000 exchanges, about 15,000 exchanges, about 20,000 exchanges, about 25,000 exchanges, about 30,000 exchanges, about 35,000 exchanges, about 40,000 exchanges, about 45,000 exchanges, about 50,000 exchanges, and/or any value between the aforementioned values. In some embodiments, the datasource of exchanges can include more than 50,000 exchanges. In some embodiments, the datasource of exchanges can include between about 5,000 exchanges and about 50,000 exchanges. In some embodiments, the datasource of exchanges can include between about 10,000 exchanges and about 30,000 exchanges.

In some embodiments, the subset of exchanges selected can include a plurality of exchanges. In some embodiments, the subset of exchanges can include about 100 exchanges, about 200 exchanges, about 300 exchanges, about 400 exchanges, about 500 exchanges, about 600 exchanges, about 700 exchanges, about 800 exchanges, about 900 exchanges, about 1,000 exchanges, about 1,500 exchanges, about 2,000 exchanges, and/or any other value between the aforementioned values. In some embodiments, the subset of exchanges can include between about 200 exchanges and about 1,000 exchanges. In some embodiments the subset of exchanges can include between about 300 exchanges and about 700 exchanges.

In some embodiments, the computer system and/or the algorithm can determine or select which exchanges from the datasource of exchanges to include in the subset of exchanges. This subset of exchanges may be involved in generating the graph used for analysis (e.g., the subset of exchanges may be used in determining how to distribute swaps across exchanges for a particular transfer or 'hop' in a transfer path, said transfer best understood as corresponding to an edge in the graph). In some embodiments, the computer system and/or the algorithm can determine or select one or more of the exchanges from the datasource of exchanges based on the source asset 104, the destination asset 106, and/or the starting amount or volume of the source asset 104. In some embodiments, one or more of the exchanges of the subset of exchanges may be predetermined based on the source asset, the destination asset, and/or the starting amount or volume of the source asset. In some embodiments, the computer system and/or the algorithm can dynamically determine or select one or more exchanges from the subset of exchanges based on exchange data. In some embodiments, the exchange data can include liquidity data (e.g., a total liquidity volume) or order book data for each of the exchanges in the datasource of exchanges, liquidity data (e.g., a liquidity volume) or order book data for the source asset 104 on each of the exchanges in the datasource of exchanges, liquidity data (e.g., a liquidity volume) or order book data for the destination asset 106 on each of the exchanges in the datasource of exchanges, a transfer volume of each of the exchanges in the datasource of exchanges, an exchange fee of each of the exchanges in the datasource of exchanges, and/or any other exchange data.

In some embodiments, the computer system and/or the algorithm can determine the subset of exchanges based on past exchange data. In some embodiments, the past exchange data can include historic exchange data, exchange data over a period of time, and/or exchange data at a previous time. In some embodiments, the past exchange data can include previous liquidity data (e.g., a previous total liquidity volume) or order book data for each of the exchanges in the datasource of exchanges, previous liquidity data (e.g., a previous liquidity volume) or order book data for the source asset 104 on each of the exchanges 110 in the datasource of exchanges 110, previous liquidity data (e.g., a previous liquidity volume) or order book data for the destination asset 106 on each of the exchanges in the datasource of exchanges, a previous transfer volume of each of the exchanges in the datasource of exchanges, previous transfers of each of the exchanges in the datasource of exchanges, a previous exchange fee of each of the exchanges in the datasource of exchanges, and/or any other past exchange data.

In some embodiments, the computer system and/or the algorithm can determine the subset of exchanges based on predicted exchange data. In some embodiments, the computer system and/or algorithm can dynamically determine the predicted exchange data. In some embodiments, the predicted exchange data can be a prediction or determination of the exchange data at a future time or a future period of time. In some embodiments, the predicted exchange data can be based on the exchange data and/or the past exchange data. In some embodiments, the predicted exchange data can include predicted liquidity data (e.g., a predicted total liquidity volume) or order book for each of the exchanges in the datasource of exchanges, predicted liquidity data (e.g., a predicted liquidity volume) or order book data for the source asset 104 on each of the exchanges in the datasource of exchanges, predicted liquidity data (e.g., a predicted liquidity) or order book data for the destination asset 106 on each of the exchanges in the datasource of exchanges, a predicted exchange fee of each of the exchanges of the datasource of exchanges, a predicted transfer volume of each of the exchanges of the datasource of exchanges, and/or any other predicted exchange data.

In some embodiments, the computer system and/or the algorithm can determine the subset of exchanges based on subsets of exchanges previously determined by the computer system and/or the algorithm. In some embodiments, the subsets of exchanges previously determined by the computer system and/or the algorithm can include subsets of exchanges used for past routing involving the source asset 104, subsets of exchanges used for past routing involving the destination asset 106, subsets of exchanges used for past routing involving a swap from the source asset 104 to the destination asset 106, subsets of exchanges used for past routing involving a similar amount or volume of the source asset 104, and/or any other subsets of exchanges used for past routing.

In some embodiments, the computer system and/or the algorithm can perform steps 204A and 204B at the same time or substantially the same time. In some embodiments, the computer system and/or the algorithm can perform steps 204A and 204B at different times. In some embodiments, the computer system and/or the algorithm can perform step 204A before the computer system and/or the algorithm performs step 204B. In some embodiments, the computer system and/or the algorithm can perform step 204B before the computer system and/or the algorithm performs step 204A.

In some embodiments, the computer system and/or the algorithm can determine the subset of exchanges at step 204B based on the subset of bridge assets determined at step 204A and/or asset data, past asset data, and/or predicted asset data of the subset of bridge assets. In some embodiments, the computer system and/or the algorithm can determine the subset of bridge assets at step 204A based on the subset of exchanges determined at step 204B and/or exchange data, past exchange data, and/or predicted exchange data of the subset of exchanges.

In some embodiments, the computer system and/or the algorithm can retrieve the asset data, past asset data, exchange data, and/or past exchange data from one or more exchanges and/or a blockchain associated with one or more assets. In some embodiments, the computer system and/or the algorithm can retrieve asset data, past asset data, exchange data, and/or past exchange data via an application program interface (API).

In some embodiments, the computer system and/or the algorithm can determine predicted asset data and/or predicted exchange data based on one or more rules of an asset and/or an exchange. In some embodiments, the computer system and/or the algorithm can retrieve the one or more rules of the asset and/or the exchange from one or more exchanges and/or a blockchain associated with one or more assets. In some embodiments, the computer system and/or the algorithm can retrieve the one or more rules of the asset and/or the exchange from source code of the asset and/or the exchange. In some embodiments, the computer system and/or the algorithm can retrieve the one or more rules of the asset and/or the exchange via an application programming interface (API), a webhook, and/or any other communication protocols.

Figure 3A:
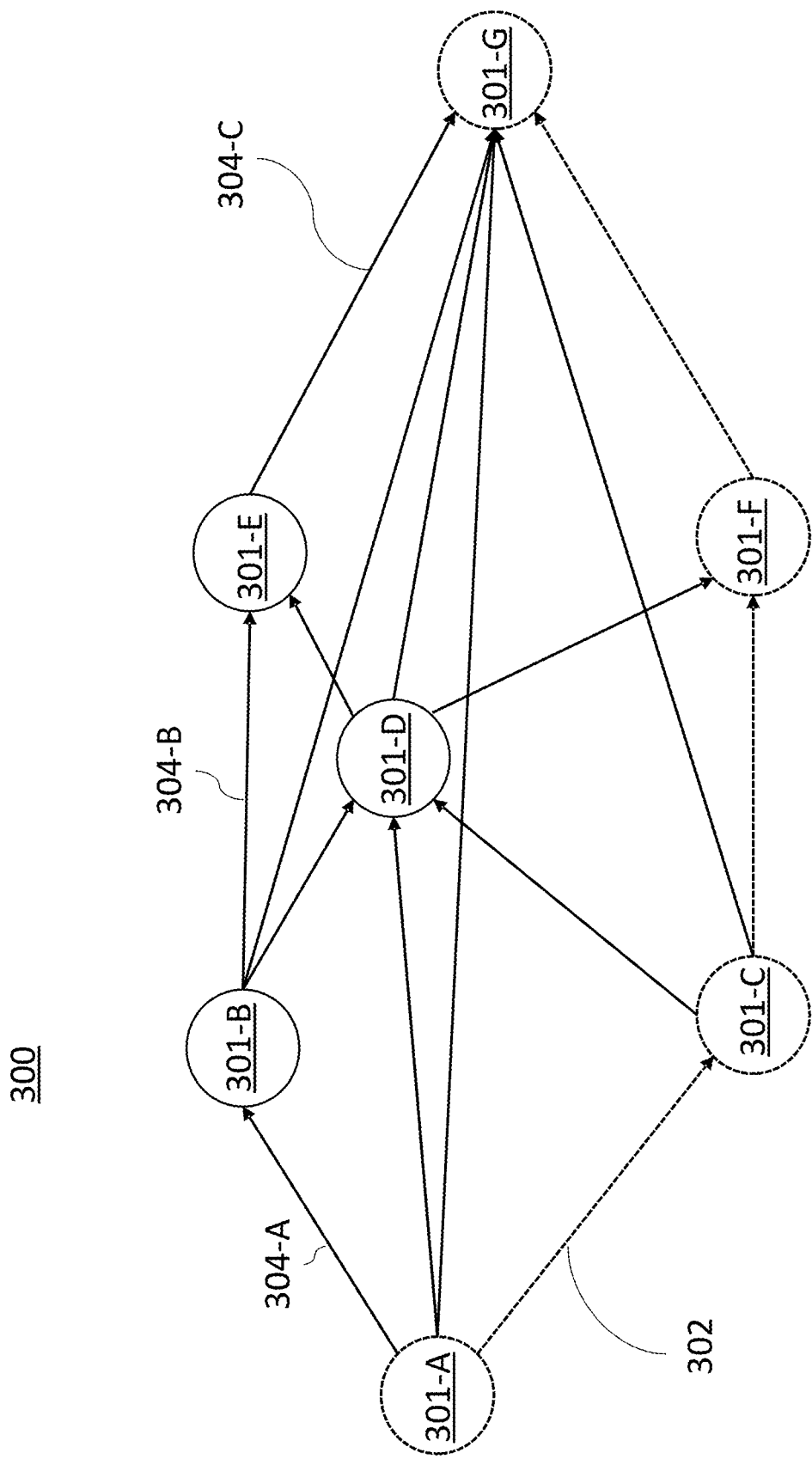
FIG. 3A illustrates an example graph according to some embodiments herein.
Figure 3B:
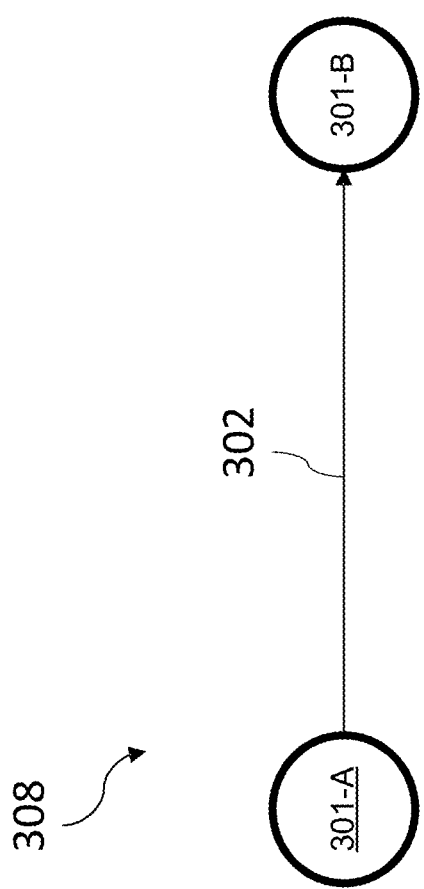
FIG. 3B illustrates a set of a graph according to some embodiments herein.

In some embodiments, at step 206, the computer system and/or the algorithm can generate a graph or abstraction based on the selected subset of bridge assets and the selected subset of exchanges (FIG. 3A and FIG. 3B describe and depict the graph in additional detail). The graph may comprise a set of nodes and a set of edges, with each edge spanning between a pair of nodes. The nodes may correspond to various assets. For example, there may be a corresponding node for the source asset 104, a corresponding node for the destination asset 106, and a corresponding node for each of the selected intermediate/bridge assets. The edges may correspond to transfers 101 or swaps between pairs of assets. For example, there may be an edge between the node for source asset 104 and the node for an intermediate asset 'A', which may correspond to a transfer that swaps an amount of the source asset 104 for the intermediate asset 'A'. Accordingly, a transfer path 102 may be conceptually thought of as a unique route or path (e.g., sequence of edges) from the source asset 104 node to the destination asset 106 node, and it may have a number of transfers 101 or 'hops' corresponding to the number of edges in that path.

In some embodiments, the graph may be a directed graph, such that each edge (also commonly known as arrows or arcs) connects an ordered pair of nodes and indicates a direction (e.g., the direction of the transfer, from the input asset to the output asset). In some embodiments, the graph may be a directed acyclic graph (DAG), which is a directed graph with no directed cycles. The edges may be directed from one node to another, in a manner such that following the edges will never form a closed loop (e.g., always ending at the destination asset 106 node by starting at the source asset 104 node and following the edges).

It is important to understand that, in some embodiments, there may actually be a plurality of edges between a pair of nodes in the graph, with each of those edges representing an exchange (e.g., taken from the selected subset of exchanges). More specifically, the edges connecting two asset nodes may correspond to all the exchanges that support a transfer between the two assets represented by the nodes. A swap between those two assets can be distributed over those exchanges, with each exchange handling a portion of the input asset to be swapped; there may be an optimal swap distribution or allocation among those exchanges that will maximize the amount of output asset received. However, at a high level of abstraction for the graph, this plurality of edges between a pair of nodes can be collapsed into a single edge, which may be helpful for determining the set of unique routes or paths from the source asset 104 node to the destination asset 106 node within the graph. For example, in FIG. 1A, the direct transfer 101-A of transfer path 102-C can be conceptually thought of in terms of FIG. 1B. The direct transfer 101-A of transfer path 102-C could be represented as a single arrow or edge in a graph representation, but, as FIG. 1B shows, a transfer 101 between an input asset 150 and an output asset 152 could be executed via multiple exchanges. For example, distributing the transfer 101 across three exchanges (e.g., exchange 110-A, exchange 110-B, and exchange 110-C) could be represented by three corresponding edges in a graph representation. Although determining an optimal multi-route transfer requires consideration of how the transfer 101 between input asset 150 and output asset 152 should be distributed over these three edges or exchanges, collapsing down these sets of edges simplifies the graph representation and allows the various transfer paths to be easily identified (e.g., as in FIG. 1A).

In some embodiments, at step 208, the computer system and/or the algorithm can analyze the graph to determine a solution for a multi-route transfer 100 (such as the example multi-route transfer 100 from the source asset 104 to the destination asset 106) that will optimize the amount of destination asset 106 received. This may involve selecting a set of transfer paths from the source asset 104 node to the destination asset 106 node in the graph, determining how to split up and distribute the starting amount of the source asset 104 across the transfer paths, and determining how to split up and distribute an amount of input asset across multiple exchanges for each transfer in a transfer path. In some embodiments, the computer system and/or algorithm may employ dynamic programming to determine the optimal solution. Dynamic programming may involve breaking down a problem into a sequence of simpler sub-problems in a recursive manner and efficiently reusing the calculated results of the sub-problems so that calculations do not need to be repeated. This approach is described in further detail in connection with FIGS. 3A and 3B.

In some embodiments, at step 210, a user may select whether to execute the multi-route transfer 100. In some embodiments, the computer system and/or the algorithm may display information about the multi-route transfer 100 to the user. In some embodiments, the information about the multi-route transfer 100 may comprise an exchange fee for the multi-route transfer 100, the volume of the destination asset 106 of the multi-route transfer 100, a value of the source asset 104, a value of the destination asset 106, the transfer paths 102 of the multi-route transfer 100, and/or any other information about the multi-route transfer 100. In some embodiments, the user may select whether to execute the multi-route transfer 100 based on the displayed information about the multi-route transfer 100. In some embodiments, if the user does not select to execute the multi-route transfer 100, the computer system and/or the algorithm can generate a new multi-route transfer 100. In some embodiments, the computer system and/or the algorithm can continuously generate a new multi-route transfer 100 in real time or substantially real time. In some embodiments, the computer system and/or the algorithm can generate a new multi-route transfer 100 periodically. In some embodiments, the computer system and/or the algorithm can generate a new multi-route transfer 100 about every 1 millisecond, 10 milliseconds, 100 milliseconds, 1 second, 2 seconds, 3 seconds, 4 seconds, 5 seconds, 6 seconds, 7 seconds, 8 seconds, 9 seconds, 10 seconds, 12 seconds 15 seconds, 20 seconds, 25 seconds, 30 seconds, 35 seconds, 40 seconds, 45 seconds, 50 seconds, 55 seconds, 1 minute, 1 minute and 15 seconds, 1 minute and 30 seconds, 1 minute and 45 seconds, 2 minutes, 5 minutes, 10 minutes, 20 minutes, 30 minutes, 40 minutes, 50 minutes, 1 hour, 2 hours, 3 hours, 4 hours, 5 hours, 6 hours, 7 hours, 8 hours, 9 hours, 10 hours, 11 hours, 12 hours, 1 day, and/or any value between the aforementioned values.

In some embodiments, if the user selects to execute the multi-route transfer 100, the computer system and/or the algorithm can execute the multi-route transfer 100 at step 212. In some embodiments, as described above, the computer system and/or the algorithm can execute the multi-route transfer 100 as an atomic multi-route transfer 100.

FIG. 3A illustrates an example graph according to some embodiments herein.

As shown in FIG. 3A, an abstraction or graph 300 may serve as a structure to model relations between one or more objects. In some embodiments, the graph 300 can include a plurality of nodes 301 (including nodes 301-A, 301-B, 301-C, 301-D, 301-E, 301-F, and 301-G) and a plurality of directed edges 302 connecting pairs of nodes 301. In some embodiments, one of the nodes 301 (e.g., node 301-A) can represent the source asset 104. In some embodiments, one of the nodes 301 (e.g., node 301-G) can represent the destination asset 106. In some embodiments, some of the nodes 301 (e.g., nodes 301-B, 301-C, 301-D, 301-E, and 301-F) can represent intermediate or bridge assets (e.g., the selected subset of bridge assets).

In some embodiments, each edge 302 can represent the subset of exchanges. In some embodiments, each edge 302 can represent one of the exchanges of the subset of exchanges. In some embodiments, each edge 302 can represent every exchange of the subset of exchanges that support a transfer between the nodes 301 (i.e., assets) connected by the edge 302. In some embodiments, the computer system and/or the algorithm can combine every exchange of the subset of exchanges that support a transfer between the nodes 301 into one edge 302. In some embodiments, the computer system and/or the algorithm can combine every exchange of the subset of exchanges that support a transfer between the nodes 301 into one edge 302 via a dynamic programming algorithm. In some embodiments, the dynamic programming algorithm can include a complexity. In some embodiments, the complexity can be $O(m*n^2)$, wherein m is the number of exchanges and n is a number of liquidity fragments of each exchange.

FIG. 3B illustrates a set of a graph according to some embodiments herein.

In some embodiments, as shown in FIG. 3B, the graph 300 can include a plurality of sets 308, wherein each set 308 is two nodes 301 (e.g., node 301-A and 301-B) connected by an edge 302. In some embodiments, each set 308 can represent a transfer 101. In some embodiments, a first node 301-A of the set 308 can represent an input asset 150 and a second node 301-B of the set 308 can represent an output asset 152.

The graph 300 may be used to solve for a multi-path transfer 100 that will optimize the amount of the destination asset received. For instance, in some embodiments, the computer system and/or the algorithm can analyze each set 308 to determine an optimized link for each set 308, wherein, as described below, the optimized link for each set 308 may comprise a distribution of the input asset 150 that results in the largest volume of the output asset 109 for each set 308. In some embodiments, the computer system and/or algorithm can retrieve an exchange fee, and/or an exchange rate for each exchange 110 represented by an edge 302 of the set 308.

In some embodiments, the computer system and/or the algorithm can determine a distribution of the input asset 150 (i.e., the first node 301-A) that results in the largest volume of the output asset 152 (i.e., the second node 301-B) for each set 308. In some embodiments, the distribution can be a percentage or portion of the volume of the input asset 150 that is transferred to the output asset 152 via each exchange 110 represented by the edge 302 of the set 308. In some embodiments, the distribution of the input asset 150 that results in the largest volume of the output asset 152 can include a distribution of the input asset 150 that results in a smallest price drop. In some embodiments, the price drop can be a change in the exchange rate between the input asset 150 and the output asset 152 based on the volume of the input asset 150 that is transferred to the output asset 152 on each exchange 110 of the edge 302. In some embodiments, the distribution can depend on the volume of the input asset 150. In some embodiments, the volume of the input asset 150 can be transferred to the output asset 152 via all of the exchanges 110 represented by the edge 302. In some embodiments, the volume of the input asset 150 can be transferred to the output asset 152 via a portion of the exchanges 110 represented by the edge 302. In some embodiments, a number of exchanges 110 used to transfer the volume of the input asset 150 to the output asset 152 can depend on the volume of the input asset 150 (i.e., the total volume of the input asset 150). In some embodiments, the number of exchanges 110 can be larger if the volume of the input asset 150 is larger. In some embodiments, the number of exchanges 110 can be smaller is the volume of the input asset 150 is smaller.

In some embodiments, the computer system and/or the algorithm can generate a transfer path 102 from the source asset 104 to the destination asset 106 based on the graph 300.

For example, a unique transfer path from node 301-A to node 301-G in graph 300 is represented by a link 304 (which is based on a sequence of edges 304-A, 304-B, and 304-C). In some embodiments, the computer system and/or the algorithm can determine every link 304 between node 301-A and node 301-G, which corresponds to every unique transfer path between the source asset 104 to the destination asset 106. In some embodiments, a link 304 can be a path from the source asset 104 to the destination asset 106 (e.g., from node 301-A to node 301-G) via one or more edges 302. In some embodiments, each link 304 can represent a transfer path 102 from the source asset 104 to the destination asset 106. In some embodiments, a link 304 can be a direct link from the source asset 104 to the destination asset 106 (i.e., path with an edge 302 that connects the source asset 104 to the destination asset 106). In some embodiments, the link 304 can include one or more nodes 301 and/or sets 308.

In some embodiments, the computer system and/or the algorithm can determine the distribution for each set 308 in each link 304 of the graph 300. In some embodiments, the computer system and/or the algorithm can determine the distribution for each set 308 in each link 304 of the graph 300 starting with each set 308 that includes the source asset 104. In some embodiments, the computer system and/or the algorithm can determine the distribution for each set 308 in each link 304 starting at the source asset 104 and moving to a next set 308, wherein the next set 308 is a set 308 where the input asset 150 is the output asset 152 of the previous set 308, until the computer system and/or the algorithm reaches the destination asset 106. In some embodiments, each transfer path 102 can include a link 304 with a determined distribution of each set 308 in the link 304

In some embodiments, the computer system and/or the algorithm can generate a multi-route transfer 100. In some embodiments, the multi-route transfer 100 may comprise a combination of transfer paths 102. In some embodiments, the multi-route transfer 100 may comprise a combination of transfer paths 102 that results in the largest volume of the destination asset 106. In some embodiments, the combination of transfer paths 102 that result in the largest volume of the destination asset 106 can include the combination of transfer paths 102 that results in a smallest price drop. In some embodiments, the computer system and/or the algorithm can limit a number of transfer paths 102 in the multi-route transfer 100 based on the volume of the source asset 104. In some embodiments, the number of transfer paths 102 can be larger if the volume of the source asset 104 is larger. In some embodiments, the number of transfer paths 102 may be lower when the volume of the source asset 104 is small.

Computer Systems

Figure 4:
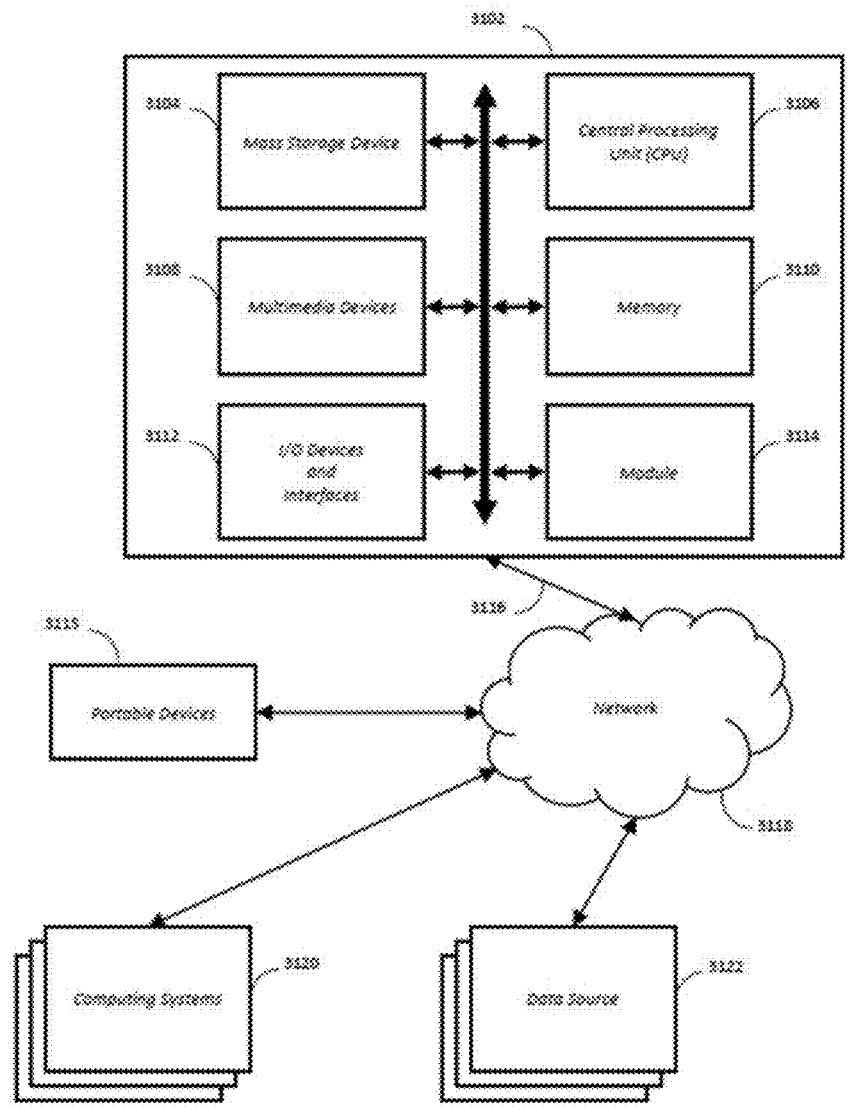
FIG. 4 is a block diagram depicting an embodiment of a computer hardware system configured to run software for implementing any systems, methods, and devices disclosed herein.

FIG. 4 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 4. The example computer system 3102 is in communication with one or more computing systems 3120 and/or one or more data sources 3122 via one or more networks 3118. While FIG. 4 illustrates an embodiment of a computing system 3102, it is recognized that the functionality provided for in the components and modules of computer system 3102 may be combined into fewer components and modules, or further separated into additional components and modules.

The computer system 3102 can comprise a module 3114 that carries out the functions, methods, acts, and/or processes described herein. The module 3114 is executed on the computer system 3102 by a central processing unit 3106 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 3102 includes one or more processing units (CPU) 3106, which may comprise a microprocessor. The computer system 3102 further includes a physical memory 3110, such as random-access memory (RAM) for temporary storage of information, a read only memory (ROM) for permanent storage of information, and a mass storage device 3104, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 3102 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 3102 includes one or more input/output (I/O) devices and interfaces 3112, such as a keyboard, mouse, touch pad, and printer. The I/O devices and interfaces 3112 can include one or more display devices, such as a monitor, that allows the visual presentation of data to a user. More particularly, a display device provides for the presentation of GUIs as application software data, and multi-media presentations, for example. The I/O devices and interfaces 3112 can also provide a communications interface to various external devices. The computer system 3102 may comprise one or more multi-media devices 3108, such as speakers, video cards, graphics accelerators, and microphones, for example.

The computer system 3102 may run on a variety of computing devices, such as a server, a Windows server, a Structure Query Language server, a Unix Server, a personal computer, a laptop computer, and so forth. In other embodiments, the computer system 3102 may run on a cluster computer system, a mainframe computer system and/or other computing system suitable for controlling and/or communicating with large databases, performing high volume transaction processing, and generating reports from large databases. The computing system 3102 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 3102 illustrated in FIG. 4 is coupled to a network 3118, such as a LAN, WAN, or the Internet via a communication link 3116 (wired, wireless, or a combination thereof). Network 3118 communicates with various computing devices and/or other electronic devices. Network 3118 is communicating with one or more computing systems 3120 and one or more data sources 3122. The module 3114 may access or may be accessed by computing systems 3120 and/or data sources 3122 through a web-enabled user access point. Connections may be a direct physical connection, a virtual connection, and other connection type. The web-enabled user access point may comprise a browser module that uses text, graphics, audio, video, and other media to present data and to allow interaction with data via the network 3118.

Access to the module 3114 of the computer system 3102 by computing systems 3120 and/or by data sources 3122 may be through a web-enabled user access point such as the computing systems' 3120 or data source's 3122 personal computer, cellular phone, smartphone, laptop, tablet computer, e-reader device, audio player, or another device capable of connecting to the network 3118. Such a device may have a browser module that is implemented as a module that uses text, graphics, audio, video, and other media to present data and to allow interaction with data via the network 3118.

The output module may be implemented as a combination of an all-points addressable display such as a cathode ray tube (CRT), a liquid crystal display (LCD), a plasma display, or other types and/or combinations of displays. The output module may be implemented to communicate with input devices 3112 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 3102 may comprise a physical or logical connection established between a remote microprocessor and a mainframe host computer for the express purpose of uploading, downloading, or viewing interactive data and databases on-line in real time. The remote microprocessor may be operated by an entity operating the computer system 3102, including the client server systems or the main server system, an/or may be operated by one or more of the data sources 3122 and/or one or more of the computing systems 3120. In some embodiments, terminal emulation software may be used on the microprocessor for participating in the micro-mainframe link.

In some embodiments, computing systems 3120 who are internal to an entity operating the computer system 3102 may access the module 3114 internally as an application or process run by the CPU 3106.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 3102 may include one or more internal and/or external data sources (for example, data sources 3122). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Cache), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), a non-relational database, or a record-based database.

The computer system 3102 may also access one or more databases 3122. The databases 3122 may be stored in a database or data repository. The computer system 3102 may access the one or more databases 3122 through a network 3118 or may directly access the database or data repository through I/O devices and interfaces 3112. The data repository storing the one or more databases 3122 may reside within the computer system 3102.

Additional Embodiments

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, or for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

We claim:

1. A computer-implemented method performed by a swap platform, the method comprising:
   receiving, from a user device of a user, an order to swap a starting amount of a source asset in exchange for a destination asset;
   selecting a subset of intermediate assets from a datasource of assets based on asset data;
   selecting a subset of exchanges from a datasource of exchanges based on the source asset, the destination asset, and exchange data;
   generating a graph based on the subset of intermediate assets and the subset of exchanges, wherein the graph is a data structure comprising:
      a plurality of nodes comprising:
         a source node representing the source asset;
         a destination node representing the destination asset; and
         a plurality of intermediate nodes presenting the subset of intermediate assets;
      a plurality of directed edges linking the plurality of nodes, wherein each edge links a pair of nodes and represents a transfer from a first asset represented by a first node of the pair to a second asset represented by a second node of the pair;
   traversing the graph along every unique path from the source node to the destination node to evaluate a set of transfer paths, wherein each transfer path exchanges a portion of the starting amount of the source asset for an amount of the destination asset;
   ranking the set of transfer paths based on the respective amount of destination asset received after transaction fees by each transfer path in the set of transfer paths;
   determining a multi-route transfer comprising a combination of non-conflicting transfer paths that optimize a total amount of destination asset exchanged for the starting amount of the source asset after transaction fees, wherein the combination of non-conflicting transfer paths are selected from the set of transfer paths based on the ranking;
   sending, to the user device, data indicating the multi-route transfer and the combination of transfer paths;
   receiving, from the user device, a user input to execute the multi-route transfer; and
   executing the multi-route transfer.

2. The computer-implemented method of claim 1, wherein the subset of intermediate assets is selected from the datastore of assets based on the source asset and the destination asset indicated in the order.

3. The computer-implemented method of claim 1, wherein at least one transfer path in the set of transfer paths comprises a direct transfer.

4. The computer-implemented method of claim 1, wherein at least one transfer path in the set of transfer paths comprises an intermediate transfer.

5. The computer-implemented method of claim 1, wherein evaluating the set of transfer paths is based on dynamic programming.

6. The computer-implemented method of claim 1, wherein the number of intermediate nodes in the plurality of intermediate nodes is bound by a max number.

7. The computer-implemented method of claim 1, wherein the source asset and the destination asset are both cryptocurrency tokens.

8. A computer system comprising:
   one or more processing devices; and
   one or more memory devices operably coupled to the one or more processing devices, the one or more memory devices storing executable code that, when executed by the one or more processing devices, causes the one or more processing devices to:
   receive, from a user device of a user, an order to swap a starting amount of a source asset in exchange for a destination asset;
   select a subset of intermediate assets from a datasource of assets based on asset data;
   select a subset of exchanges from a datasource of exchanges based on the source asset, the destination asset, and exchange data;
   generate a graph based on the subset of intermediate assets and the subset of exchanges, wherein the graph is a data structure comprising:
      a plurality of nodes comprising:
         a source node representing the source asset;
         a destination node representing the destination asset; and
         a plurality of intermediate nodes presenting the subset of intermediate assets;
      a plurality of directed edges linking the plurality of nodes, wherein each edge links a pair of nodes and represents a transfer from a first asset represented by a first node of the pair to a second asset represented by a second node of the pair;

traverse the graph along every unique path from the source node to the destination node to evaluate a set of transfer paths, wherein each transfer path exchanges a portion of the starting amount of the source asset for an amount of the destination asset;

rank the set of transfer paths based on the respective amount of destination asset received after transaction fees by each transfer path in the set of transfer paths;

determine a multi-route transfer comprising a combination of non-conflicting transfer paths that optimize a total amount of destination asset exchanged for the starting amount of the source asset after transaction fees, wherein the combination of non-conflicting transfer paths are selected from the set of transfer paths based on the ranking;

send, to the user device, data indicating the multi-route transfer and the combination of transfer paths;

receive, from the user device, a user input to execute the multi-route transfer; and execute the multi-route transfer.

9. The system of claim 8, wherein the subset of intermediate assets is selected from the datastore of assets based on the source asset and the destination asset indicated in the order.

10. The system of claim 8, wherein at least one transfer path in the set of transfer paths comprises a direct transfer.

11. The system of claim 8, wherein at least one transfer path in the set of transfer paths comprises an intermediate transfer.

12. The system of claim 8, wherein evaluating the set of transfer paths is based on dynamic programming.

13. The system of claim 8, wherein the number of intermediate nodes in the plurality of intermediate nodes is bound by a max number.

14. A non-transient computer readable medium containing program instructions for causing a computer system to perform the steps of:

receiving, from a user device of a user, an order to swap a starting amount of a source asset in exchange for a destination asset;

selecting a subset of intermediate assets from a datasource of assets based on asset data;

selecting a subset of exchanges from a datasource of exchanges based on the source asset, the destination asset, and exchange data;

generating a graph based on the subset of intermediate assets and the subset of exchanges, wherein the graph is a data structure comprising:

a plurality of nodes comprising:
a source node representing the source asset;
a destination node representing the destination asset; and
a plurality of intermediate nodes presenting the subset of intermediate assets;

a plurality of directed edges linking the plurality of nodes, wherein each edge links a pair of nodes and represents a transfer from a first asset represented by a first node of the pair to a second asset represented by a second node of the pair;

traversing the graph along every unique path from the source node to the destination node to evaluate a set of transfer paths, wherein each transfer path exchanges a portion of the starting amount of the source asset for an amount of the destination asset;

ranking the set of transfer paths based on the respective amount of destination asset received after transaction fees by each transfer path in the set of transfer paths;

determining a multi-route transfer comprising a combination of non-conflicting transfer paths that optimize a total amount of destination asset exchanged for the starting amount of the source asset after transaction fees, wherein the combination of non-conflicting transfer paths are selected from the set of transfer paths based on the ranking;

sending, to the user device, data indicating the multi-route transfer and the combination of transfer paths;

receiving, from the user device, a user input to execute the multi-route transfer; and executing the multi-route transfer.

15. The non-transient computer readable medium of claim 14, wherein the subset of intermediate assets is selected from the datastore of assets based on the source asset and the destination asset indicated in the order.

16. The non-transient computer readable medium of claim 14, wherein at least one transfer path in the set of transfer paths comprises a direct transfer.

17. The non-transient computer readable medium of claim 14, wherein at least one transfer path in the set of transfer paths comprises an intermediate transfer.

18. The non-transient computer readable medium of claim 14, wherein evaluating the set of transfer paths is based on dynamic programming.

19. The non-transient computer readable medium of claim 14, wherein the number of intermediate nodes in the plurality of intermediate nodes is bound by a max number.

20. The non-transient computer readable medium of claim 14, wherein the source asset and the destination asset are both cryptocurrency tokens.

* * * * *